(12) United States Patent
Charlebois et al.

(10) Patent No.: US 12,115,557 B2
(45) Date of Patent: Oct. 15, 2024

(54) POWDER RECLAMATION SYSTEM FOR MULTIPLE METAL POWDER PROCESSING DEVICES

(71) Applicant: General Electric Company, Schenectady, NY (US)

(72) Inventors: Anthony Charlebois, Boisbriand (CA); Mathieu Roy, Sainte-Marthe-sur-le-lac (CA); Patrick Gauthier, Saint-Colomban (CA)

(73) Assignee: General Electric Company, Evendale, OH (US)

( * ) Notice: Subject to any disclaimer, the term of this patent is extended or adjusted under 35 U.S.C. 154(b) by 855 days.

(21) Appl. No.: 16/666,812

(22) Filed: Oct. 29, 2019

(65) Prior Publication Data

US 2021/0121955 A1 Apr. 29, 2021

(51) Int. Cl.
| | | |
|---|---|---|
| *B07B 1/46* | (2006.01) | |
| *B07B 1/54* | (2006.01) | |
| *B07B 9/00* | (2006.01) | |
| *B22F 10/00* | (2021.01) | |
| *B22F 10/10* | (2021.01) | |

(Continued)

(52) U.S. Cl.
CPC .............. *B07B 1/4663* (2013.01); *B07B 1/54* (2013.01); *B07B 9/00* (2013.01); *B22F 10/00* (2021.01); *B22F 10/40* (2021.01); *B22F 10/73* (2021.01); *B22F 12/52* (2021.01); *B22F 12/57* (2021.01); *B33Y 40/00* (2014.12); *B33Y 50/00* (2014.12); *B22F 10/10* (2021.01); *B22F 10/31* (2021.01); *B22F 10/68* (2021.01); *B22F 12/38* (2021.01);

(Continued)

(58) Field of Classification Search
CPC .............................. B22F 10/73; B29C 64/357
See application file for complete search history.

(56) References Cited

U.S. PATENT DOCUMENTS

| | | |
|---|---|---|
| 4,678,560 A | 7/1987 | Stole et al. |
| 2007/0084762 A1* | 4/2007 | Mainwaring ............. B07B 1/48 |
| | | 209/405 |
| 2016/0193696 A1 | 7/2016 | McFarland et al. |
| 2017/0348771 A1 | 12/2017 | Kawada et al. |

(Continued)

FOREIGN PATENT DOCUMENTS

| | | |
|---|---|---|
| CN | 203955525 U | 11/2014 |
| DE | 2720173 A1 | 11/1978 |

(Continued)

*Primary Examiner* — Timothy Kennedy
*Assistant Examiner* — Ariella Machness
(74) *Attorney, Agent, or Firm* — Dority & Manning, P.A.

(57) ABSTRACT

A powder reclamation system is provided. The powder reclamation system includes a support structure; a filter housing movable relative to the support structure, the filter housing defining an inlet and an outlet; a raw reclaimed powder hopper in communication with the inlet of the filter housing; a first reclamation passageway in communication with the raw reclaimed powder hopper and configured to be in communication with a first metal powder processing device to recover a first unused portion of a first powder from the first metal powder processing device to the raw reclaimed powder hopper; and a second reclamation passageway in communication with the raw reclaimed powder hopper and configured to be in communication with a second metal powder processing device to recover a second unused portion of a second powder from the second metal powder processing device to the raw reclaimed powder hopper.

9 Claims, 23 Drawing Sheets

(51) Int. Cl.
*B22F 10/31* (2021.01)
*B22F 10/40* (2021.01)
*B22F 10/68* (2021.01)
*B22F 10/73* (2021.01)
*B22F 12/00* (2021.01)
*B22F 12/52* (2021.01)
*B22F 12/57* (2021.01)
*B22F 12/58* (2021.01)
*B22F 12/70* (2021.01)
*B22F 12/90* (2021.01)
*B33Y 40/00* (2020.01)
*B33Y 50/00* (2015.01)

(52) U.S. Cl.
CPC ............... *B22F 12/58* (2021.01); *B22F 12/70* (2021.01); *B22F 12/90* (2021.01)

(56) References Cited

U.S. PATENT DOCUMENTS

| | | | | |
|---|---|---|---|---|
| 2018/0021855 | A1* | 1/2018 | De Lajudie | B22F 12/00 419/26 |
| 2018/0281236 | A1* | 10/2018 | Elgar | B29C 64/25 |
| 2019/0126346 | A1* | 5/2019 | Graichen | B22F 3/003 |
| 2019/0151954 | A1 | 5/2019 | Xiao et al. | |
| 2019/0337018 | A1* | 11/2019 | Tatsumoto | B07B 1/38 |
| 2021/0197449 | A1* | 7/2021 | Otis, Jr. | B22F 10/73 |
| 2021/0197469 | A1 | 7/2021 | Laws et al. | |
| 2021/0197476 | A1 | 7/2021 | Ewald | |

FOREIGN PATENT DOCUMENTS

| | | |
|---|---|---|
| DE | 2846342 A1 | 5/1979 |
| EP | 0074935 A2 | 9/1982 |
| WO | WO2017194118 A1 | 11/2017 |
| WO | WO-2020125837 A1 * | 6/2020 |

* cited by examiner

POWDER RECLAMATION SYSTEM FOR MULTIPLE METAL POWDER PROCESSING DEVICES

FIELD

The present subject matter relates generally to a powder reclamation system, or more particularly to a powder reclamation system that is operable with multiple metal powder processing devices.

BACKGROUND

Additive manufacturing techniques, processes, or machines refer generally to manufacturing processes wherein successive layers of material(s) are provided on each other to "build-up," layer-by-layer, a three-dimensional component. The successive layers generally fuse together to form a monolithic component which may have a variety of integral sub-components. Some additive manufacturing techniques, processes, or machines involve an energy source that is used to selectively sinter or melt portions of a layer of powder and involve successively depositing layers of additive powder. In such machines, powder removal and collection for additive manufacturing machines may be required after each machine cycle. Powder removal and/or collection may be difficult for these machines due to a variety of factors including, e.g., a size and configuration of a printed object due to the size and weight. An efficient powder recycling and sieving process is thus needed.

BRIEF DESCRIPTION

Aspects and advantages of the invention will be set forth in part in the following description, or may be obvious from the description, or may be learned through practice of the invention.

In one exemplary embodiment of the present disclosure, a powder reclamation system is provided. The powder reclamation system includes a support structure; a filter housing movable relative to the support structure, the filter housing defining an inlet and an outlet; a raw reclaimed powder hopper in communication with the inlet of the filter housing; a first reclamation passageway in communication with the raw reclaimed powder hopper and configured to be in communication with a first metal powder processing device to recover a first unused portion of a first powder from the first metal powder processing device to the raw reclaimed powder hopper; and a second reclamation passageway in communication with the raw reclaimed powder hopper and configured to be in communication with a second metal powder processing device to recover a second unused portion of a second powder from the second metal powder processing device to the raw reclaimed powder hopper.

In an exemplary aspect of the present disclosure, a method of reclaiming powder using a powder reclamation system is provided. The method includes recovering a first unused portion of a first powder from a first metal powder processing device; recovering a second unused portion of a second powder from a second metal powder processing device; providing the first unused portion of the first powder and the second unused portion of the second powder to a housing of a powder reclamation system comprising a separator; separating a first portion of the first and second powders from a second portion of the first and second powders using the separator; recirculating a first part of the second portion of the first and second powders back to the first metal powder processing device; and recirculating a second part of the second portion of the first and second powders back to the second metal powder processing device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
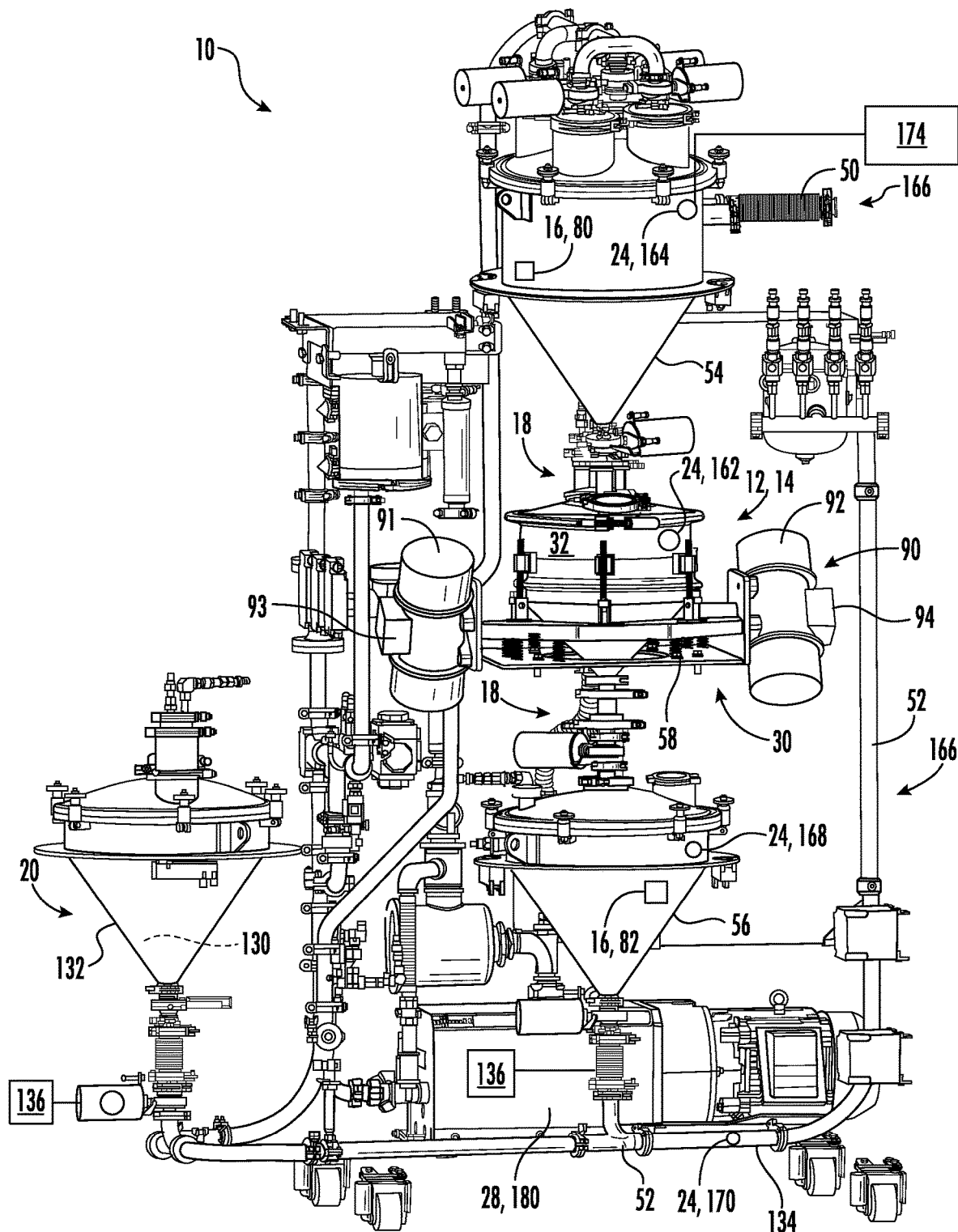
FIG. 1 is a perspective view of a powder sieving system utilizing a broad frequency filter that is part of a powder reclamation system in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

A powder reclamation system of the present disclosure allows for the recovery, sieving, and recirculation of unused portions of powder from one or more metal powder processing devices. A powder reclamation system of the present disclosure includes a multiple metal powder processing device attachment assembly that allows for a powder reclamation system of the present disclosure to connect to and recover powder from a plurality of metal powder processing devices.

Figure 2:
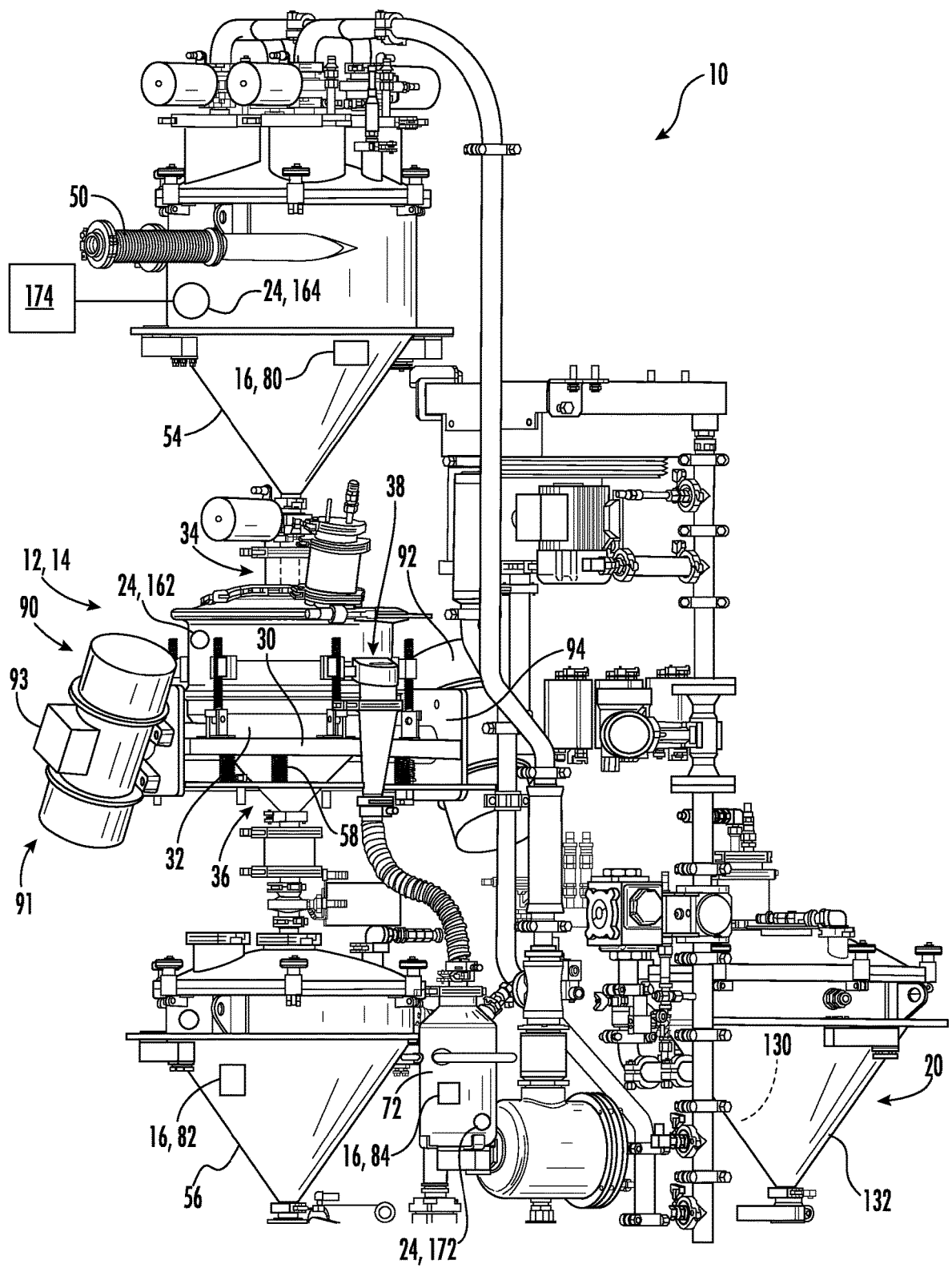
FIG. 2 is an enlarged perspective view of a powder sieving system utilizing a broad frequency filter that is part of a powder reclamation system in accordance with an exemplary embodiment of the present disclosure.

Referring now to the drawings, wherein identical numerals indicate the same elements throughout the figures, FIGS. 1-23 illustrate various exemplary embodiments of the present disclosure. More specifically, referring first to FIGS. 1-13, generally, a powder reclamation system 10 in accordance with an exemplary embodiment of the present disclosure is provided. More specifically, still, referring to FIGS. 1-2, the exemplary powder reclamation system 10 is depicted. FIG. 1 provides a front view of the exemplary powder reclamation system, and FIG. 2 provides a rear view of the exemplary powder reclamation system 10. As will be appreciated from FIGS. 1 and 2, and the description herein, the exemplary powder reclamation system generally includes a powder sieving system assembly 12, a broad frequency filter assembly 14, a powder mass control assembly 16, an isolation assembly 18, a new or virgin powder assembly 20, an oxygen sensing assembly 24, and a carrier gas assembly 28. Notably, for the embodiment shown, the broad frequency filter assembly 14, the powder mass control assembly 16, and the isolation assembly 18 are each configured as part of the exemplary powder sieving assembly 12.

As will be explained in greater detail below, the powder reclamation system 10 is generally configured to receive a reclaimed powder from a metal powder processing device 100 (FIGS. 12 and 18), sieve the powder, and provide the sieved powder (along with a desired amount of virgin powder) back to the metal powder processing device. For the embodiment depicted, the powder reclamation system 10 generally includes a raw reclaimed powder hopper 54 for receiving the reclaimed powder, a filter housing 32 downstream of the raw reclaimed powder hopper 54 for receiving a raw reclaimed powder from the raw reclaimed powder hopper 54, a filtered reclaimed powder hopper 56 for receiving a sieved reclaimed powder from the filter housing 32, an oversized powder hopper 72 for receiving an oversized portion of the raw reclaimed powder hopper 54 from the filter housing 32 (see FIG. 2), a virgin powder hopper 132 arranged in parallel with the filtered reclaimed powder hopper 56 and a network of passageways 166 connecting the various hopper and features of the reclamation system to one another and to a metal powder processing device 100.

As will be appreciated from the description herein, the raw reclaimed powder hopper 54, the filter housing 32, and the filtered reclaimed powder hopper 56 (and certain other aspects) may be configured as a stand-alone sieving system, and may not be incorporated into a powder reclamation system (see, e.g., the embodiment of FIG. 14, discussed below).

Referring particularly to the filter housing 32, in the exemplary embodiment depicted, the filter housing 32 includes a broad frequency filter assembly 14. The broad frequency filter assembly 14 of the present disclosure restricts a first portion 27 of a powder 26 (FIGS. 5 and 6) larger than a predetermined threshold and allows a second portion 29 of the powder 26 (FIGS. 5 and 6) smaller than the predetermined threshold to pass therethrough.

It is also contemplated that the broad frequency filter 14 may include a separator that is configured to separate a first portion of the powder from a second portion of the powder. For example, the broad frequency filter 14 including a separator, in addition to being able to filter by powder sizes, may also be able to separate based on different types of powders, to remove clumps, and/or other separation criteria.

Figure 3:
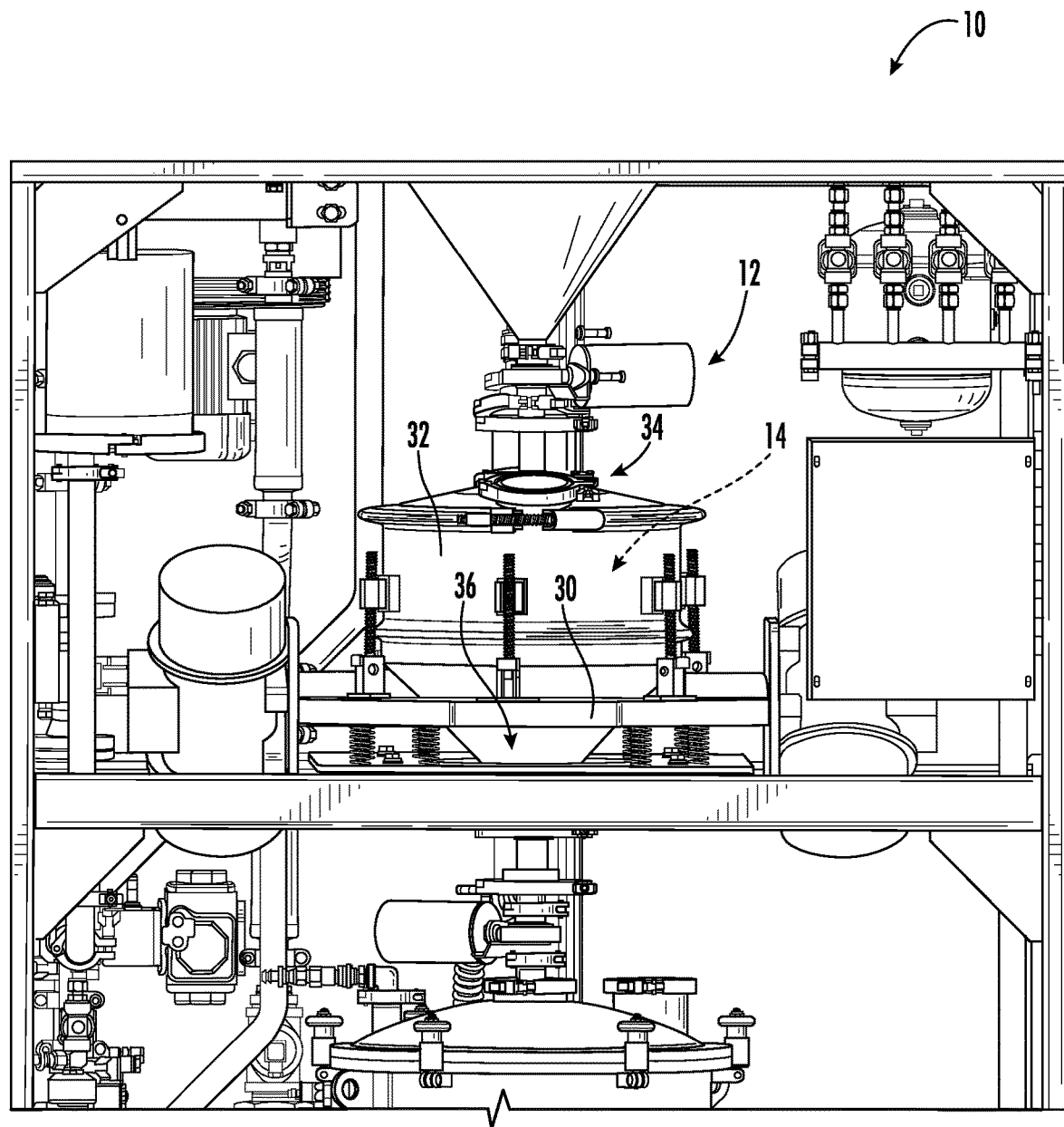
FIG. 3 is a perspective view of a powder sieving system, a first motor, and a second motor that are part of a powder reclamation system in accordance with an exemplary embodiment of the present disclosure.
Figure 4:
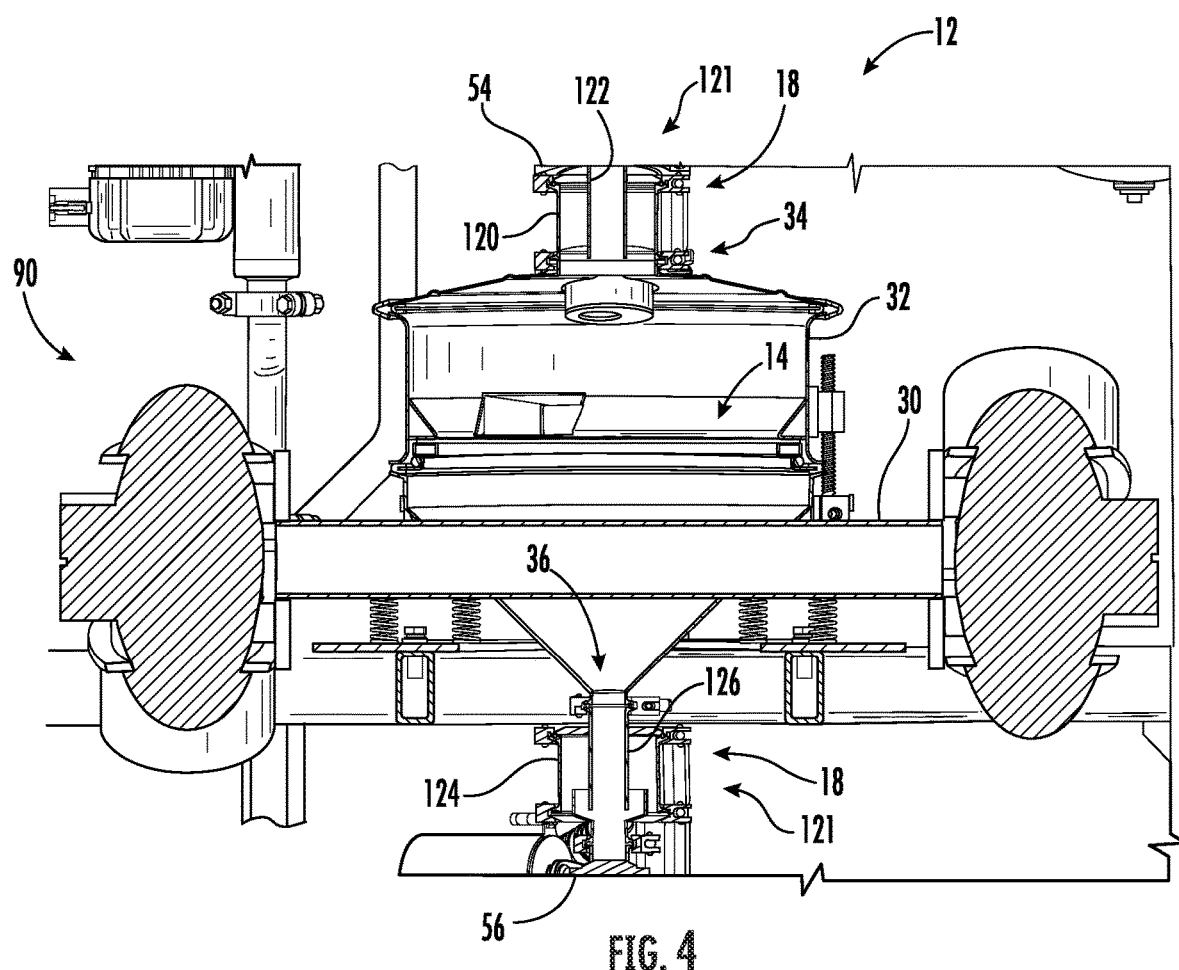
FIG. 4 is a perspective view of a powder sieving system utilizing a broad frequency filter that is part of a powder reclamation system in accordance with an exemplary embodiment of the present disclosure.
Figure 5:
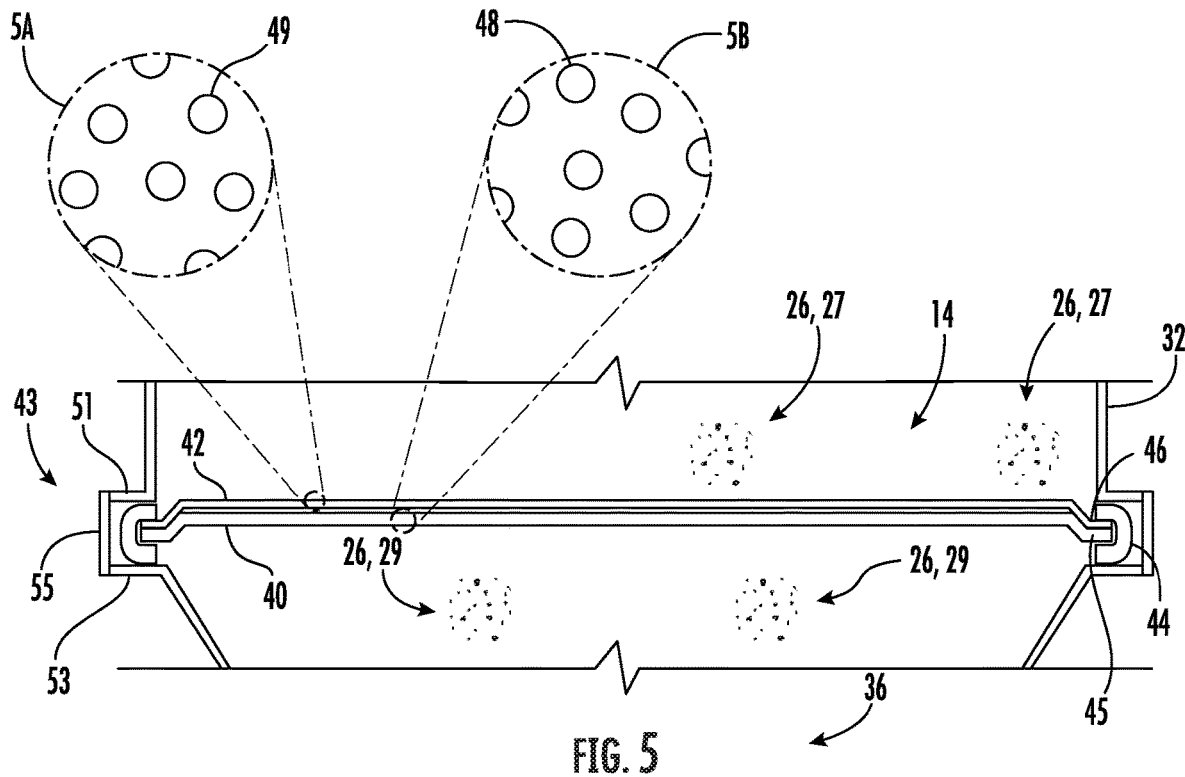
FIG. 5 is a cross-sectional view of a broad frequency filter of a powder sieving system, with enlarged views of a portion of a first filter and a second filter, in accordance with an exemplary embodiment of the present disclosure.

Referring to FIGS. 3 through 5, aspects of the filter housing 32 and broad frequency filter 14 will be described. FIG. 3 provides a close-up view of the filter housing 32 of FIGS. 1-2, FIG. 4 provides a close-up, cross-sectional view of the filter housing 32 of FIG. 3, and FIG. 5 provides a close-up, cross-sectional view of the broad frequency filter assembly 14. In the exemplary embodiment depicted, the powder reclamation system 10 further includes a support structure 30, with the filter housing 32 being movable relative to the support structure 30. The filter housing 32 defines an inlet 34 and an outlet 36 and includes the broad frequency filter assembly or broad frequency filter 14 disposed between the inlet 34 and the outlet 36 of the filter housing 32.

Referring particularly to FIG. 5, in an exemplary embodiment, the broad frequency filter 14 includes a first filter 40 and a second filter 42. The first filter 40 is fixed relative to the filter housing 32. In one embodiment, the first filter 40 is substantially rigid, e.g., the first filter 40 is substantially fixed relative to the filter housing 32. For example, in at least certain exemplary embodiments, the first filter 40 may be configured to deflect or flex a maximum of less than about 0.5 inches during normal operations. The second filter 42 is coupled within the filter housing 32 adjacent to the first filter 40. More specifically, the second filter 42 is coupled within the filter housing 32 such that the second filter 42 contacts the first filter 40 during operation of the broad frequency filter 14.

Figure 6:
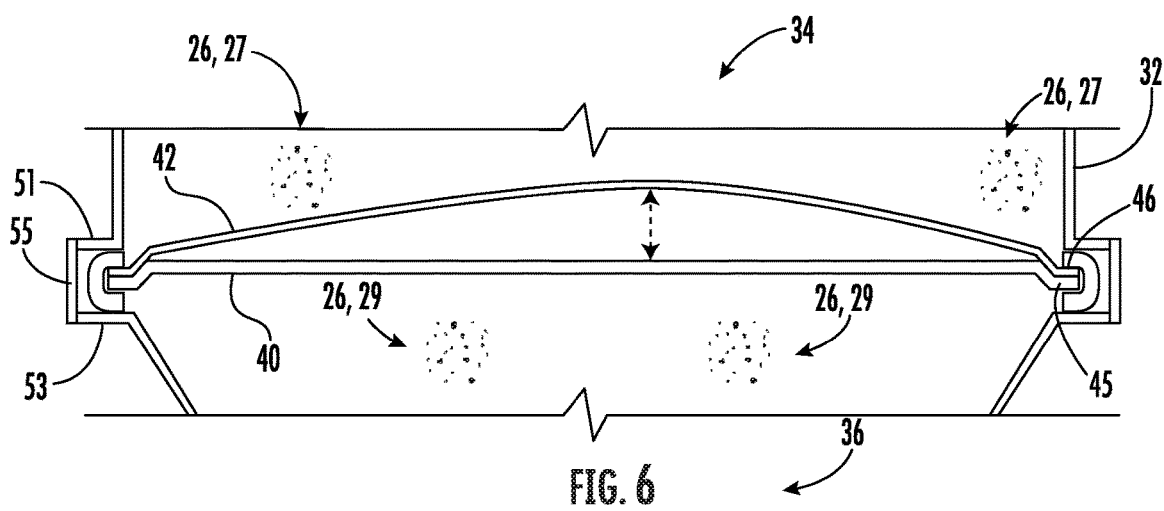
FIG. 6 is a cross-sectional view of a broad frequency filter of a powder sieving system, with a second filter moved away from a first filter, in accordance with an exemplary embodiment of the present disclosure.

In one embodiment, the second filter 42 is substantially flexible, i.e., the second filter 42 is movable relative to the first filter 40 within the filter housing 32 when the filter housing 32 moves relative to the support structure 30. For example, referring now also to FIG. 6, providing another close-up view of the broad frequency filter assembly 14, with the second filter 42 in a deflected position, the second filter 42 is movable relative to the first filter 40 within the filter housing 32 from a first, initial position (FIG. 5) to a second, maximum deflection position (FIG. 6). As is depicted in FIG. 6, in an exemplary embodiment, when the second filter 42 is in the maximum deflection position, the second filter 42 defines a maximum deflection away from the first filter 40 greater than ¼ inch and less than 5 inches.

It is contemplated that in the maximum deflection position, the second filter 42 may be spaced other distances away from the first filter 40. For example, in another exemplary embodiment, in the maximum deflection position, the second filter 42 defines a maximum deflection away from the first filter 40 greater than ¼ inch and less than 4 inches. In another exemplary embodiment, in the maximum deflection position, the second filter 42 defines a maximum deflection away from the first filter 40 greater than ¼ inch and less than 3 inches. In another exemplary embodiment, in the maximum deflection position, the second filter 42 defines a maximum deflection away from the first filter 40 greater than ¼ inch and less than 2 inches. In another exemplary embodiment, in the maximum deflection position, the second filter 42 defines a maximum deflection away from the first filter 40 greater than ¼ inch and less than 1 inch. In another exemplary embodiment, in the maximum deflection position, the second filter 42 defines a maximum deflection away from the first filter 40 greater than ½ inch and less than 1 inch.

As will be appreciated, the maximum deflection is defined in a direction perpendicular to a reference plane defined by the first filter. The movement of the second filter to the maximum deflection position is caused by a movement of the filter housing in a generally vertical direction by a plurality of motors, as well be explained in greater detail below with reference to, e.g., FIGS. 8 and 9.

The first filter 40 and the second filter 42 of the broad frequency filter 14 are configured to restrict a first portion 27 of a powder 26 larger than a predetermined threshold from reaching the outlet 36 of the filter housing 32 and to allow a second portion 29 of the powder 26, i.e., filtered reclaimed or recycled powder 29, smaller than the predetermined threshold to pass through the first filter 40, the second filter 42, and the outlet 36 of the filter housing 32. In an exemplary embodiment, the predetermined threshold of the first filter 40 and the second filter 42 of the broad frequency filter 14 is approximately 15 μm. In another exemplary embodiment, the predetermined threshold of the first filter 40 and the second filter 42 of the broad frequency filter 14 is approximately 150 μm. It is contemplated that the predetermined threshold of the first filter 40 and the second filter 42 of the broad frequency filter 14 may include other sizes. For example, in other exemplary embodiments, the predetermined threshold of the first filter 40 and the second filter 42 of the broad frequency filter 14 may be anywhere from approximately 15 μm to approximately 150 μm.

In order to facilitate such selective passage of the second portion of the powder therethrough, the first and second filters define a plurality of pores. More particularly, referring to the close-up portion 5A of second filter 42 and close-up portion 5B of first filter 40 in FIG. 5, the first filter 40 defines a plurality of first pores 48 extending through a thickness of the first filter 40 and the second filter 42 defines a plurality of second pores 49 extending through a thickness of the second filter 42. Notably, the views in the close-up portion 5A of second filter 42 and close-up portion 5B of first filter 40 in FIG. 5 are top-down views of a surface of the first filter 40 and second filter 42, respectively. In certain embodiments, the plurality of first pores 48 may each define a size (e.g., width) less than a size of the plurality of second pores 49. Alternatively, however, the first and second pores 48, 49 may all be substantially the same size.

During operation of the broad frequency filter 14, as noted above, the second filter 42 moves between the initial position and the maximum deflection position, as a result of a generally vertical movement of the filter housing 32. Such movement causes the second filter 42 to contact the first filter 40, or "slap" the first filter 40. Such contact may reduce an amount of clogging or blockage within the first and second pores 48, 49 of the first and second filters 40, 42, resulting in a relatively efficient process.

In an exemplary embodiment, the first filter 40 and the second filter 42 are metallic filters. For example, in one embodiment, the first filter 40 and the second filter 42 are formed of a stainless steel. However, it is contemplated that the first filter 40 and the second filter 42 may be formed of other materials, e.g., other metallic materials.

In one embodiment, a powder reclamation system 10 of the present disclosure is configured to recover, filter, and recirculate a powder. The powder may be a reactive metal powder (i.e., may be formed of a metal powder that reacts with oxygen), such as a titanium or titanium alloy powder. Alternatively, the powder may consist of, e.g., an aluminum powder or other suitable powder.

Furthermore, referring still to FIGS. 5 and 6, the filter housing 32 includes a mounting assembly 43 and a seal 44 for mounting and sealing the first and second filters 40, 42 of the broad frequency filter 14 within the filter housing 32. For example, the mounting assembly 43 provides a mechanism for mounting the first filter 40 adjacent to the second filter 42 within the filter housing 32. Specifically, for the embodiment shown, the mounting assembly 43 of the filter housing 32 includes a first circumferential flange 51 and a second circumferential flange 53, and a coupling 55 extending between the first and second circumferential flanges 51, 53. The coupling 55 may be a nut, a plurality of bolts or screws, a clamp, etc. When assembled the coupling 55 presses the first and second circumferential flanges 51, 53 together. Notably, a circumferential end or outside edge 45 of the first filter 40 and a circumferential end or outside edge 46 of the second filter 42 are positioned between the first and second circumferential flanges 51, 53, such that when assembled, the first and second filters 40, 42 are fixed in position within the filter housing 32.

Figure 7:
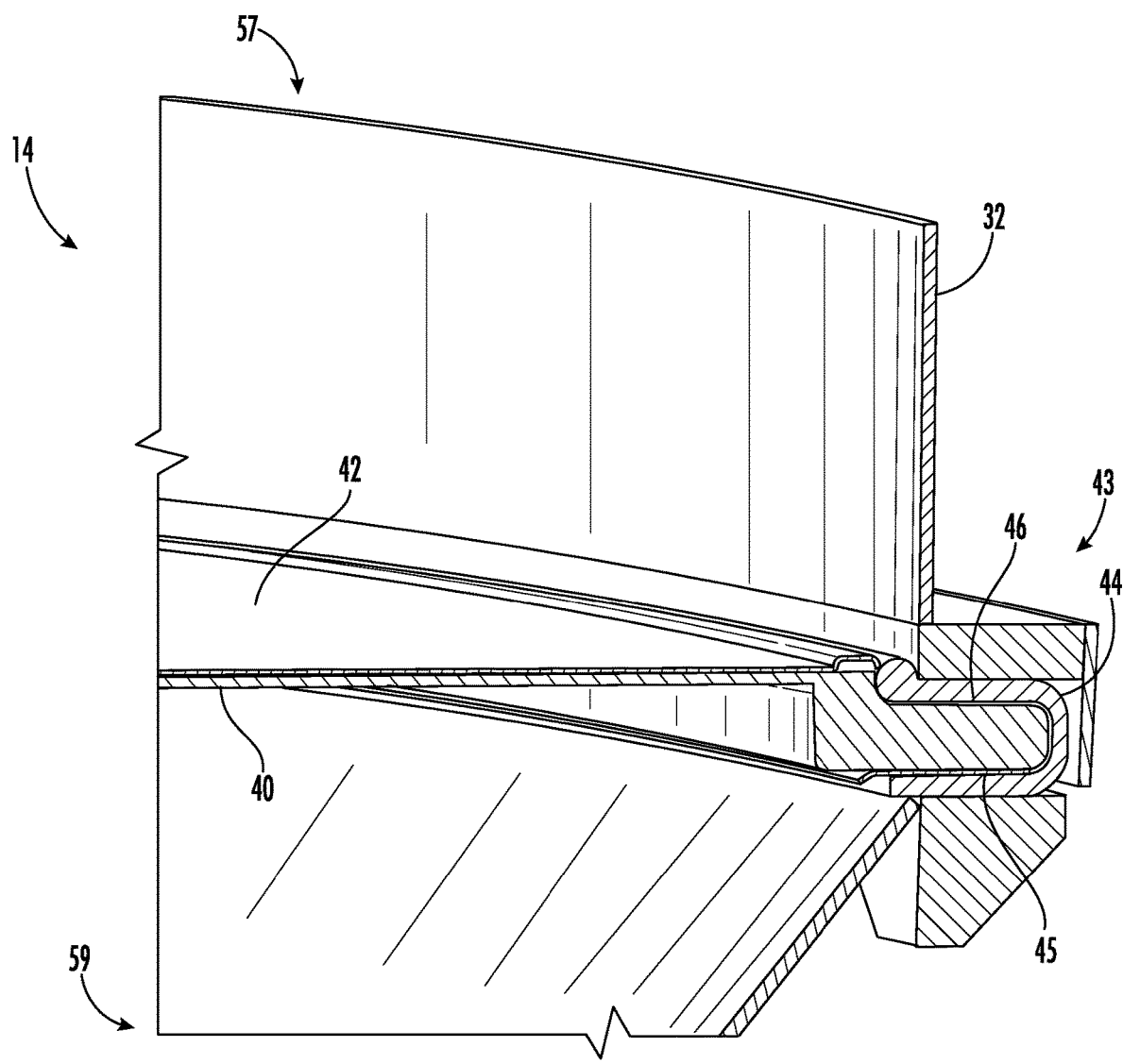
FIG. 7 is a cross-sectional view of a portion of a broad frequency filter of a powder sieving system in accordance with an exemplary embodiment of the present disclosure.

Moreover, referring now also to FIG. 7, a close-up, cross-sectional view of the mounting assembly 43 is provided. The above-described configuration is depicted with additional clarity. In addition, for the embodiment depicted, the filter housing 32 also includes a continuous U-shaped seal 44 that extends around an outside edge 45 of the first filter 40 and around an outside edge 46 of the second filter 42. The seal 44 ensures a sealed environment of the filter housing 32 so that no portion of powder 26 escapes or plumes out of the filter housing 32. More specifically, for the embodiment depicted, the filter housing 32 defines an upstream portion 57 located upstream of the first and second filters 40, 42 and a downstream portion 59 located downstream of the first and second filters 40, 42. The U-shaped seal 44 extends continuously from the upstream portion 57, around the outside edges 45, 46 of the first and second filters 40, 42, to the downstream portion 59. In such a manner, any powder that makes its way between the seal 44 and the outside edges 45, 46 of the first and second filters 40, 42 can only travel to the downstream portion 59 of the filter housing 32 (and not to an ambient location outside of the filter housing 32). It will be appreciated that any powders small enough to travel between the first and second filters 40, 42 and the U-shaped seal 44 will most likely be smaller than the first and second pores 48, 49 (FIG. 5).

Referring back to FIGS. 1 and 2, as briefly mentioned above, the broad frequency filter 14 is effective at least in part as a result of the generally vertical movement of the filter housing 32 during operation. As is depicted, the powder sieving system assembly 12 of the present disclosure (which as noted above is incorporated into the exemplary powder reclamation system 10) includes a vibration assembly 90 for providing and controlling movement of the filter housing 32 relative to the support structure 30 and the second filter 42 relative to the first filter 40. In one exemplary embodiment, the vibration assembly 90 includes a first motor 91 and a second motor 92. The first motor 91 is positioned relative to a portion of the filter housing 32 via a first motor mounting assembly 93 and the second motor 92 is positioned relative to a portion of the filter housing 32 via a second motor mounting assembly 94. In one embodiment, the first motor 91 is a first linear displacement motor and the second motor 92 is a second linear displacement motor. In this manner, the first motor 91 and the second motor 92 provide linear movement to the filter housing 32 relative to the support structure 30.

Figure 8:
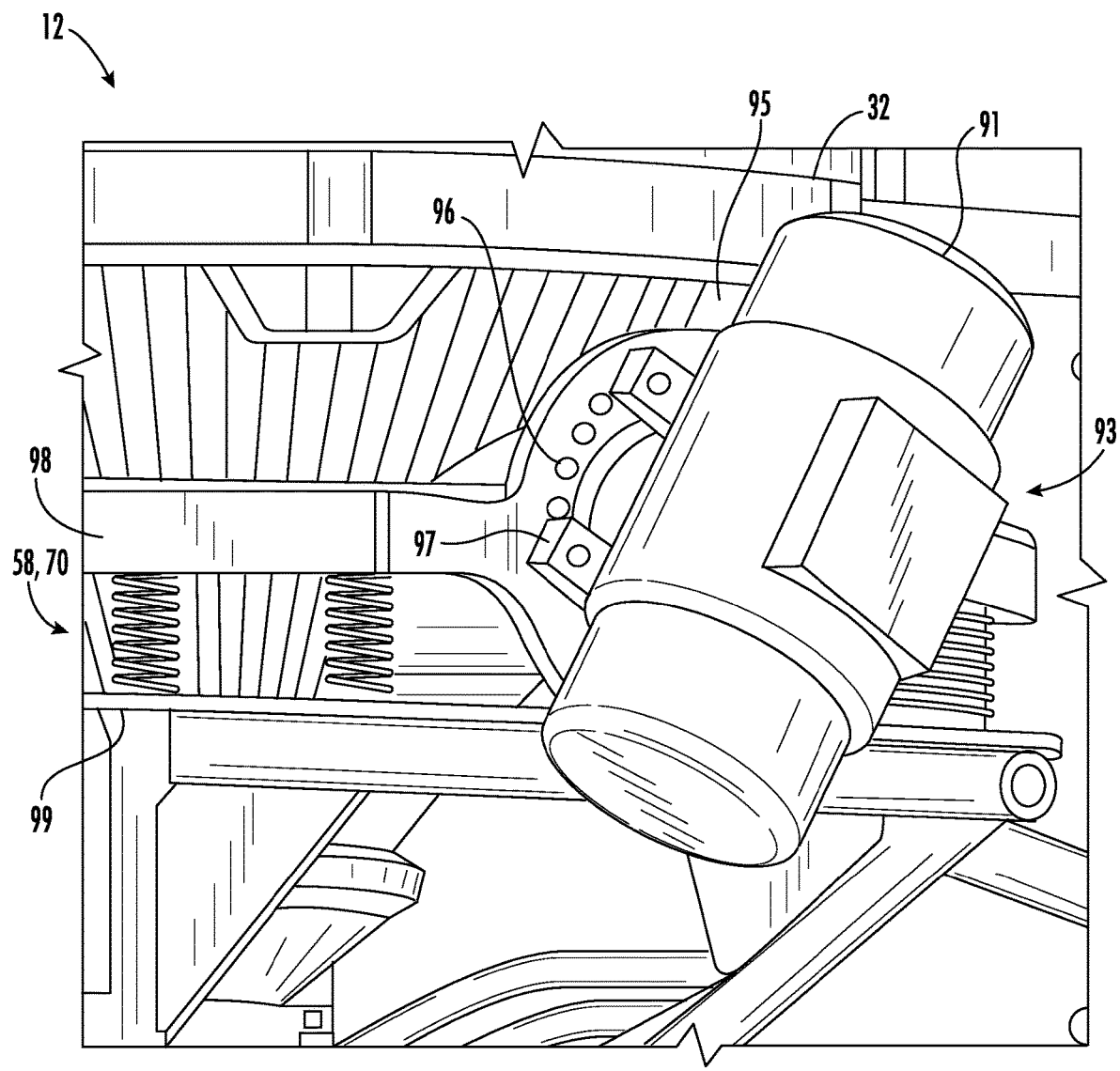
FIG. 8 is a side perspective view of a portion of a powder sieving system in accordance with an exemplary embodiment of the present disclosure.
Figure 9:
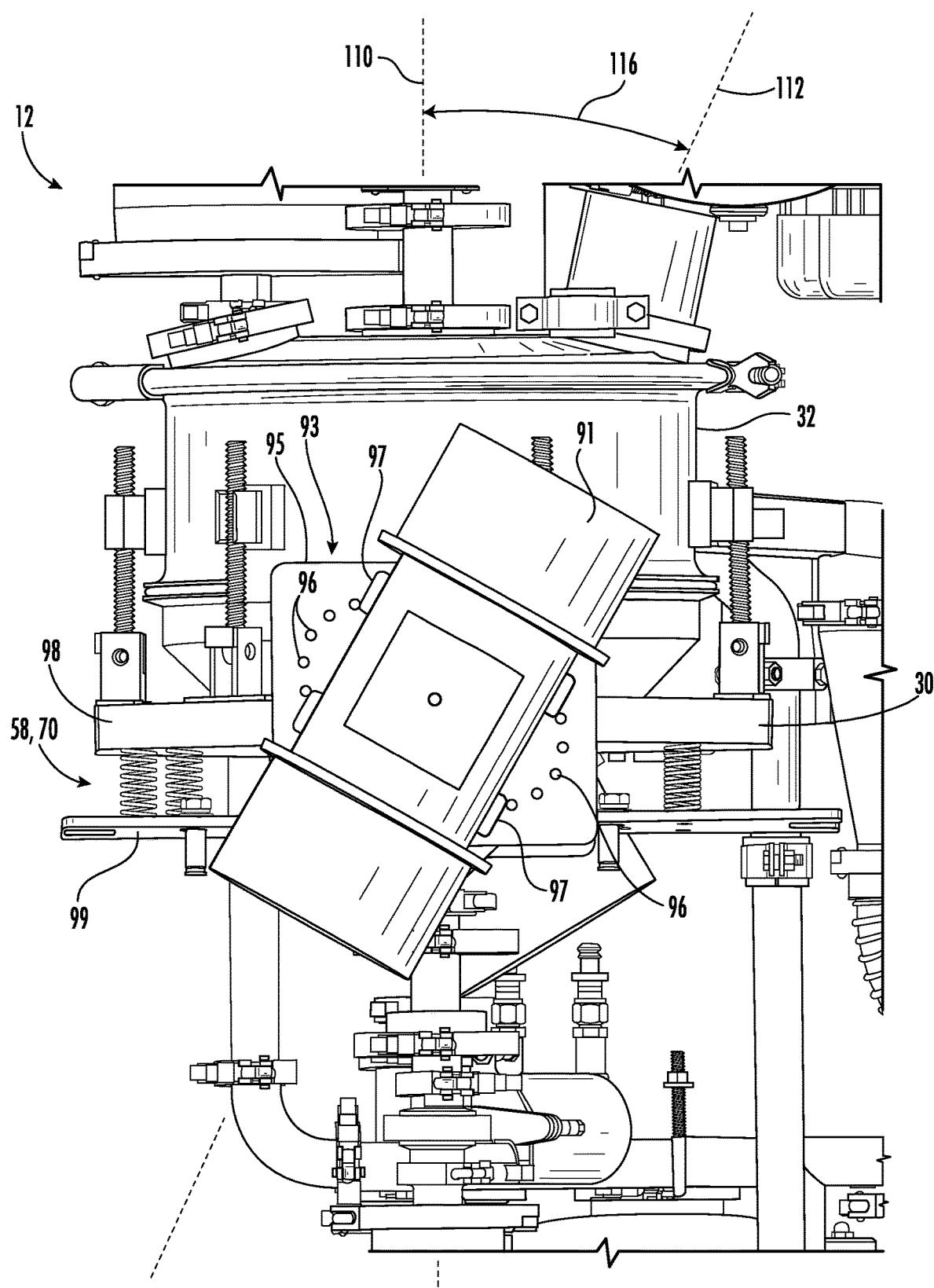
FIG. 9 is another side perspective view of a portion of a powder sieving system that is part of a powder reclamation system in accordance with an exemplary embodiment of the present disclosure.

Referring now also to FIGS. 8 and 9, the first motor 91 is depicted and described in greater detail. FIG. 8 provides a perspective view of the first motor 91 mounted to the filter housing via the first motor mounting assembly 93, and FIG. 9 provides a straight-on view of the first motor 91 mounted to the filter housing via the first motor mounting assembly 93.

As will be appreciated from FIGS. 8 and 9, the filter housing 32 defines a longitudinal axis 110, which for the embodiment depicted is parallel to a vertical direction. Additionally, the first motor 91 is a first linear displacement motor configured to move along a first displacement axis 112. In an exemplary embodiment, the first displacement axis 112 defines a first angle 116 with the longitudinal axis 110 greater than about 15 degrees and less than about 85 degrees.

As is further depicted, the first motor 91 is adjustably mounted to a portion of the filter housing 32 via the first motor mounting assembly 93 such that the first motor 91 is adjustably mounted to adjust an angle between the first displacement axis 112 and the longitudinal axis 110. Specifically, the first motor mounting assembly 93 includes a plate 95 with a plurality of mounting holes or openings 96, as well as a bracket 97 fixed to the first motor 91. The bracket 97 is mountable to the plate 95 using the plurality of mounting holes 96. By choosing the mounting holes 96 utilized to mount the bracket 97 to the plate 95, the first angle 116 between the longitudinal axis 110 and the first displacement axis 112 may be modified.

Furthermore, although not depicted in detail in FIGS. 8 and 9, it will be appreciated that the second motor 92 and second motor mounting assembly 94 may be configured in substantially the same manner as the first motor 91 and first motor mounting assembly 93. In such a manner, it will be appreciated that the second motor 92 may define a second displacement axis that defines an angle with the longitudinal axis 110 of the filter housing 32 similar to the first angle 116 (or different than the first angle 116). Further, in such a manner it will be appreciated that the second motor 92 may be adjustably mounted to a portion of the filter housing 32 via the second motor mounting assembly 94 such that the second motor 92 is adjustably mounted to adjust an angle between the second displacement axis and the longitudinal axis 110.

Notably, however, in other embodiments, the first and second motors 91, 92 may be configured in any other suitable manner. For example, in other embodiments, the motors 91, 92 may define any other angle with the longitudinal axis 110, may be mounted to the filter housing 32 in any other suitable manner, etc. Further, although two motors 91, 92 are shown, in other embodiments, the vibration assembly 90 may include any other suitable number or arrangement of motors.

Briefly, referring still to FIGS. 8 and 9 (and as may also be seen, e.g., in FIGS. 1 and 2), the powder reclamation system 10 of the present disclosure further includes a plurality of dampers 58 that extend between the support structure 30 and the filter housing 32 for mechanically isolating a movement of the filter housing 32 during operation of the powder sieving system assembly 12 and/or powder reclamation system 10. In one embodiment, the plurality of dampers 58 may comprise a plurality of springs 70. More specifically, the exemplary system 10 depicted includes a plate 98 coupled to the support structure 30 and a mounting ring 99 coupled to the filter housing 32. The plurality of dampers 58 extend between the plate 98 and the mounting ring 99.

It will be appreciated that the angle of the motors 91, 92 may generally be used to assist with the spreading of powder along a top surface of the filters 40, 42 in addition to the provision of the generally vertical movement to facilitate the second filter 42 moving relative to, and hitting against, the first filter 40. More specifically, it will be appreciated that by angling the first and second motors 91, 92, a centrifugal force component is applied to the powder on top of the first filter 40, forcing the powder too large to fit through the pores 48 of the first filter 40 towards the outer edge of the first filter 40.

Figure 10:
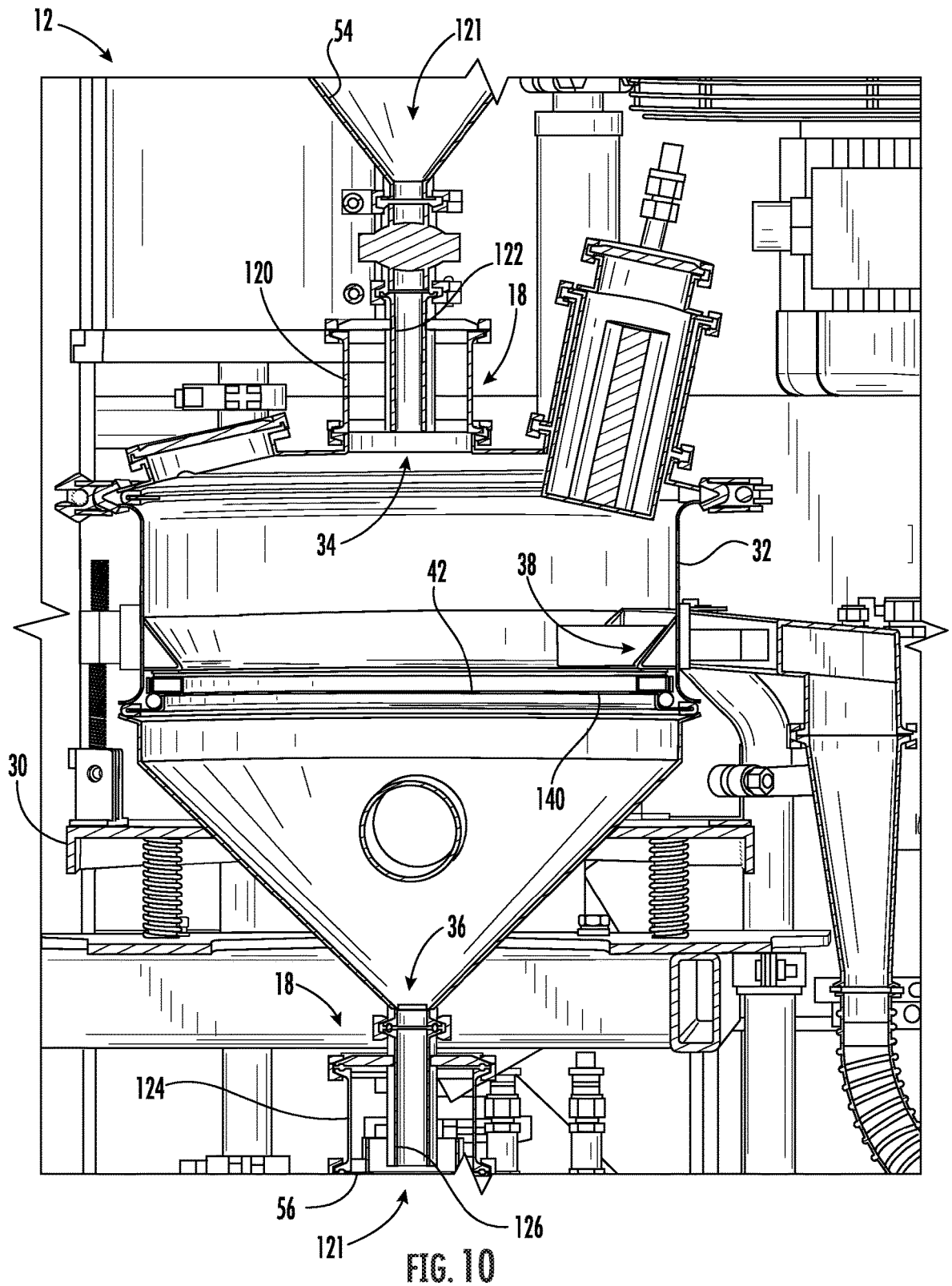
FIG. 10 is a perspective view of a portion of a powder sieving system that is part of a powder reclamation system in accordance with an exemplary embodiment of the present disclosure.
Figure 11:
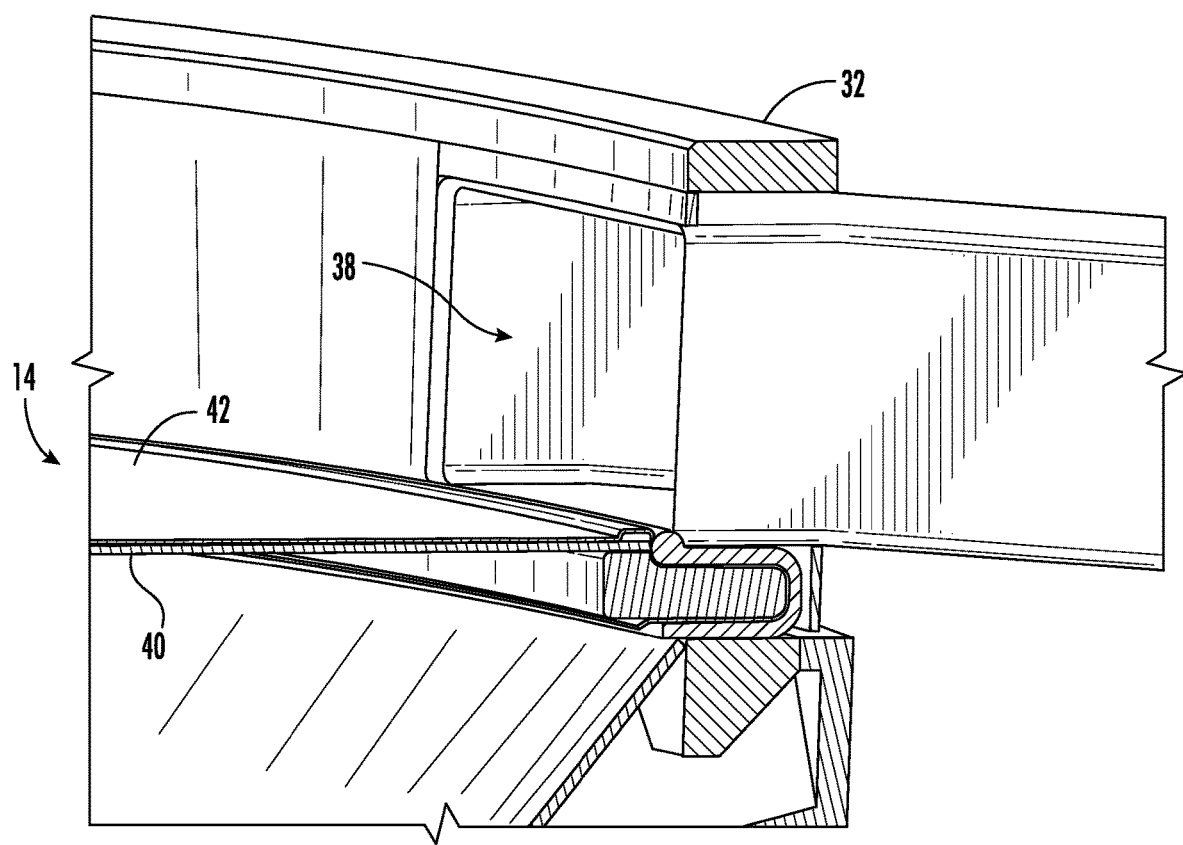
FIG. 11 is a cross-sectional view of a second portion of a broad frequency filter in accordance with an exemplary embodiment of the present disclosure.

More specifically, referring now also to FIGS. 10 and 11, providing a cross-sectional view of the filter housing 32 having an oversized powder or second outlet 38, and a close-up of the oversized powder outlet 38, respectively, it will be appreciated that the filter housing 32 also defines a second outlet 38 (i.e., an oversized powder outlet) that is positioned upstream of the first filter 40 and the second filter 42 for receiving the first portion 27 of the powder 26 that is larger than the predetermined threshold and that is restricted by the broad frequency filter 14 from passing therethrough. Advantageously, the movement of the second filter 42 relative to the first filter 40 and the movement of the filter housing 32 relative to the support structure 30 helps to move the first portion 27 of the powder 26 to the second outlet 38. More specifically, as discussed above, the angled orientation of the first and second motors 91, 92 generates a centrifugal force that urges the powder 26 towards the outer edge 45 of the first filter 40, allowing the powder 26 to spread over the first filter 40, and for the powder 26 that doesn't pass through the first filter 40 to be ejected from the filter housing 32 through the second opening 38 to an oversized powder hopper 72 (see FIG. 2).

In an exemplary embodiment, the powder reclamation system 10, the powder sieving system assembly 12, and the broad frequency filter assembly 14 of the present disclosure include an oversized powder hopper 72 (see FIG. 2) that is positioned downstream of the second outlet 38 of the filter housing 32, e.g., the oversized powder hopper 72 and the second outlet 38 of the filter housing 32 are in flow communication. In this manner, the first portion 27 of the powder 26 that does not pass through the broad frequency filter 14 moves through the second outlet 38 of the filter housing 32 and is collected within the oversized powder hopper 72.

Notably, in an exemplary embodiment, a powder reclamation system 10 of the present disclosure includes an isolation assembly 18 for isolating a powder 26 traveling through a powder reclamation system 10 to only come into contact with metallic portions to prevent contamination of the powder 26 with non-metallic portions. The isolation assembly 18 may facilitate such isolation despite the movement of the filter housing 32 described above generated by the vibration assembly 90 relative to the support structure 30, and the raw reclaimed powder hopper 54, the filtered reclaimed powder hopper 56, and the oversized powder hopper 72.

More specifically, referring now to FIGS. 4 and 10, providing close up views of the isolation assembly 18 at the connection between the raw reclaimed powder hopper 54 and the filter housing 32, and between the filter housing 32 and the filtered reclaimed powder hopper 56, respectively, the isolation assembly 18 includes powder passageways 121 that include a flexible mounting portion 120, 124 and a metallic liner portion 122, 126 that is respectively positioned within the flexible mounting portion 120, 124. For example, referring particularly to the embodiment depicted in FIG. 4, the isolation assembly 18 includes a first flexible mounting 120 that extends between the raw reclaimed powder hopper 54 and the inlet 34 of the filter housing 32 and a first metallic liner 122 that is positioned within the first flexible mounting 120 and is fixed to one of the raw reclaimed powder hopper 54 or the inlet 34 of the filter housing 32. In particular, for the embodiment depicted, the first metallic liner 122 is fixed to the raw reclaimed powder hopper 54, such that the first metallic liner 122 does not move with the filter housing 32 when the filter housing 32 is vibrated using the vibration assembly 90.

Similarly, referring particularly to FIGS. 4 and 10, the isolation assembly 18 includes a second flexible mounting 124 that extends between the outlet 36 of the filter housing 32 and the filtered reclaimed powder hopper 56 and a second metallic liner 126 that is positioned within the second flexible mounting 124 and is fixed to one of the filtered reclaimed powder hopper 56 or the outlet 36 of the filter housing 32. In particular, for the embodiment depicted, the second metallic liner 126 is fixed to the filter housing 32, such that the second metallic liner 126 is configured to move with the filter housing 32 relative to the filtered reclaimed powder hopper 56 when the filter housing 32 is vibrated using the vibration assembly 90.

In this manner, a powder 26 traveling through a powder reclamation system 10 only comes into contact with metallic portions, i.e., the metallic liner portions 122, 126, to prevent contamination of the powder 26 with non-metallic portions, i.e., the flexible mounting portions 120, 124. Furthermore, this configuration allows for the flexible mounting portions 120, 124 to expand and contract along with the movement of the powder sieving system 12 during operation. In certain exemplary embodiments, the metallic liners 122, 126 may be, e.g., a stainless steel or other suitable material. By contrast, the flexible mountings 120, 124 may be an elastomeric or other flexible material.

As will further be appreciated from the description herein, a powder reclamation system 10 in accordance with one or more embodiments of the present disclosure is able to recover unused portions of powder 26 from a metal powder processing device, sieve the powder to a desired size distribution, and then return the powder to the metal powder processing device (along with some virgin powder, as desired).

As used herein, the term "metal powder processing device" refers to any metal powder processing device or system such as additive manufacturing machines, powder removal devices or systems, mixing stations, or other metal powder processing devices or systems. Furthermore, portions of a powder reclamation system or portions of a powder sieving system of the present disclosure are configured to be in communication with such metal powder processing devices. As used herein, the term "in communication with" refers to any type of connection or attachment between portions of a powder reclamation system or portions of a powder sieving system of the present disclosure with such metal powder processing devices for recovering a portion of a powder from the metal powder processing devices.

Figure 12:
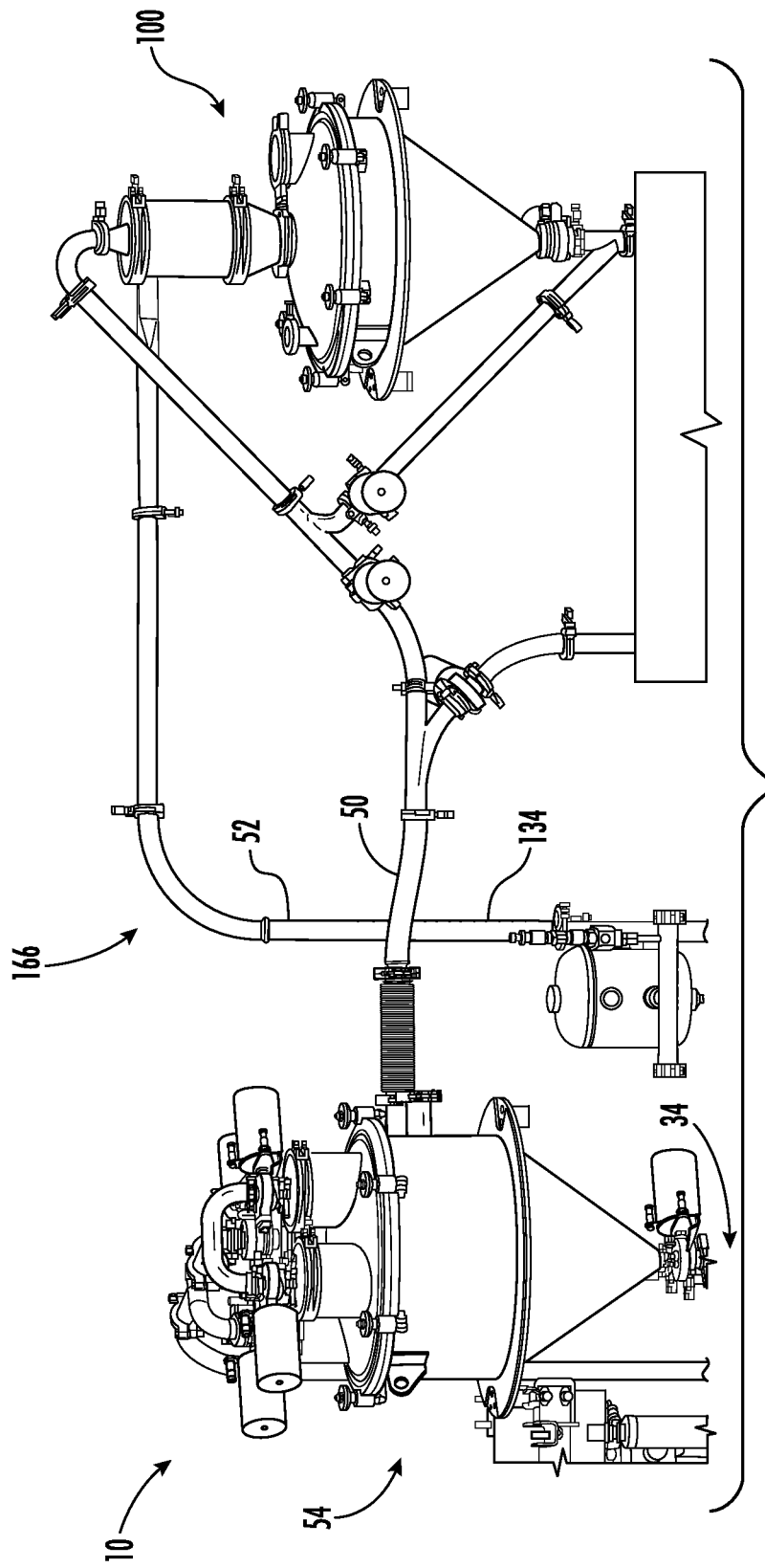
FIG. 12 is a perspective view of a powder reclamation system in communication with a metal powder processing device in accordance with an exemplary embodiment of the present disclosure.
Figure 18:
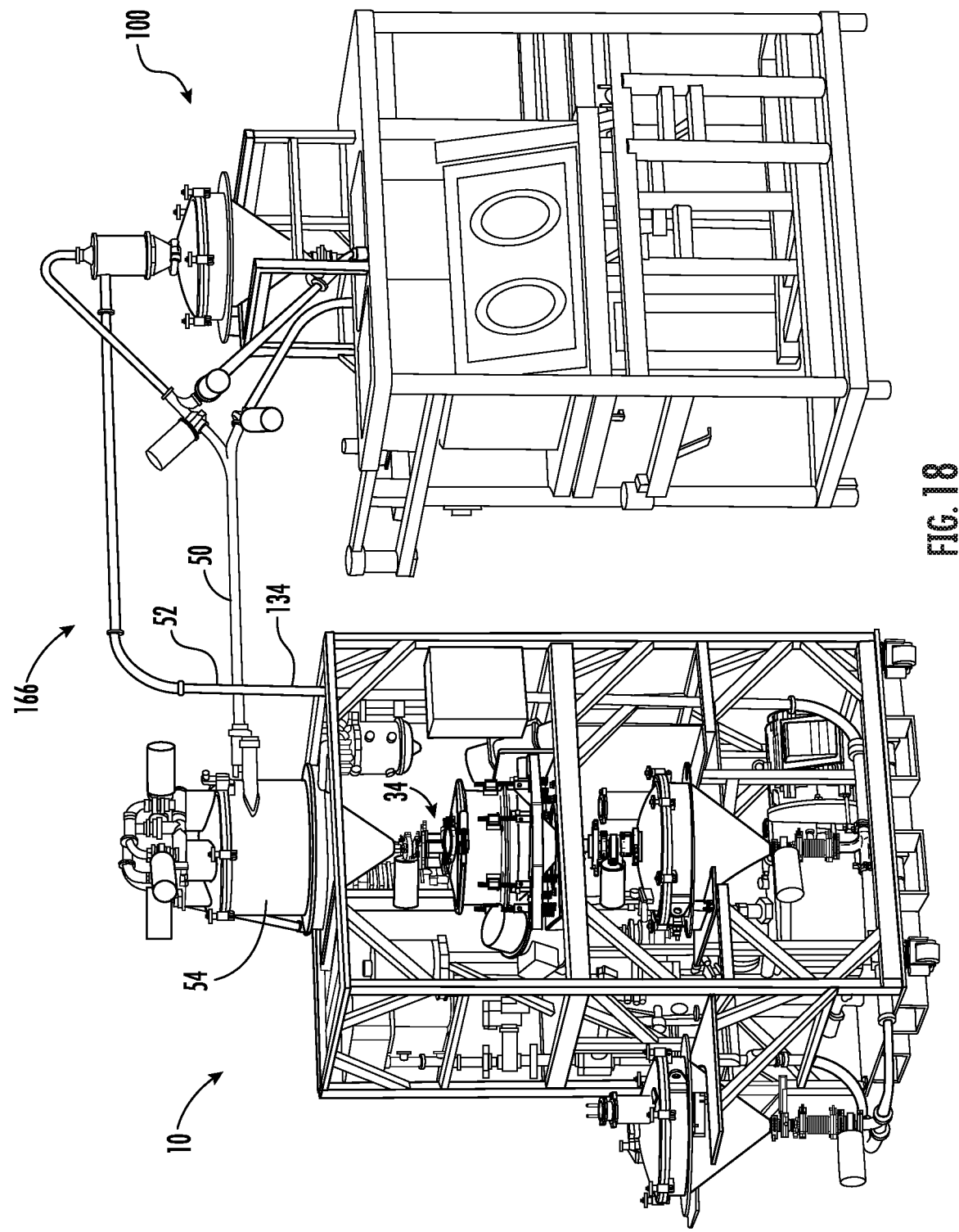
FIG. 18 is a perspective view of a powder reclamation system in communication with a metal powder processing device in accordance with an exemplary embodiment of the present disclosure.

More specifically, referring now also to FIGS. 12 and 18, a powder reclamation system 10 of the present disclosure is depicted in connection with a metal powder processing device 100. As noted above, the powder reclamation system 10 includes a network of passageways 166, a raw reclaimed powder hopper 54, a filtered reclaimed powder hopper 56, and a plurality of dampers 58. The network of passageways 166 connects the various hopper and features of the reclamation system 10 to one another and to a metal powder processing device 100. In particular, for the embodiment depicted, the network of passageways 166 includes a reclamation passageway 50 and a recirculation passageway 52.

During reclamation operations of the powder reclamation system 10, the reclamation passageway 50 is configured to receive unused powder from the metal powder processing device 100. The unused powder may be transported through the reclamation passageway 50 by flowing a carrier gas through the metal powder processing device 100 and from the metal powder processing device 100 through the reclamation passageway 50.

Referring still to FIGS. 12 and 18, in an exemplary embodiment, the raw reclaimed powder hopper 54 is in communication with the inlet 34 of the filter housing 32. The raw reclaimed powder hopper 54 receives an unused portion of a powder 26 from the metal powder processing device 100. In one embodiment, the reclamation passageway 50 is in communication with the inlet 34 of the filter housing 32 and is configured to recover the unused portion of the powder 26 from the metal powder processing device 100. For example, in one embodiment, the reclamation passageway 50 is in communication with the raw reclaimed powder hopper 54 and a metal powder processing device 100. In this manner, the reclamation passageway 50 provides a conduit or channel to recover an unused portion of a powder 26 from the metal powder processing device 100 to the raw reclaimed powder hopper 54 which is in communication with the inlet 34 of the filter housing 32. A powder 26 travels through the reclamation passageway 50 to the raw reclaimed powder hopper 54 and through the inlet 34 of the filter housing 32 to the broad frequency filter 14 for filtering.

Figure 13:
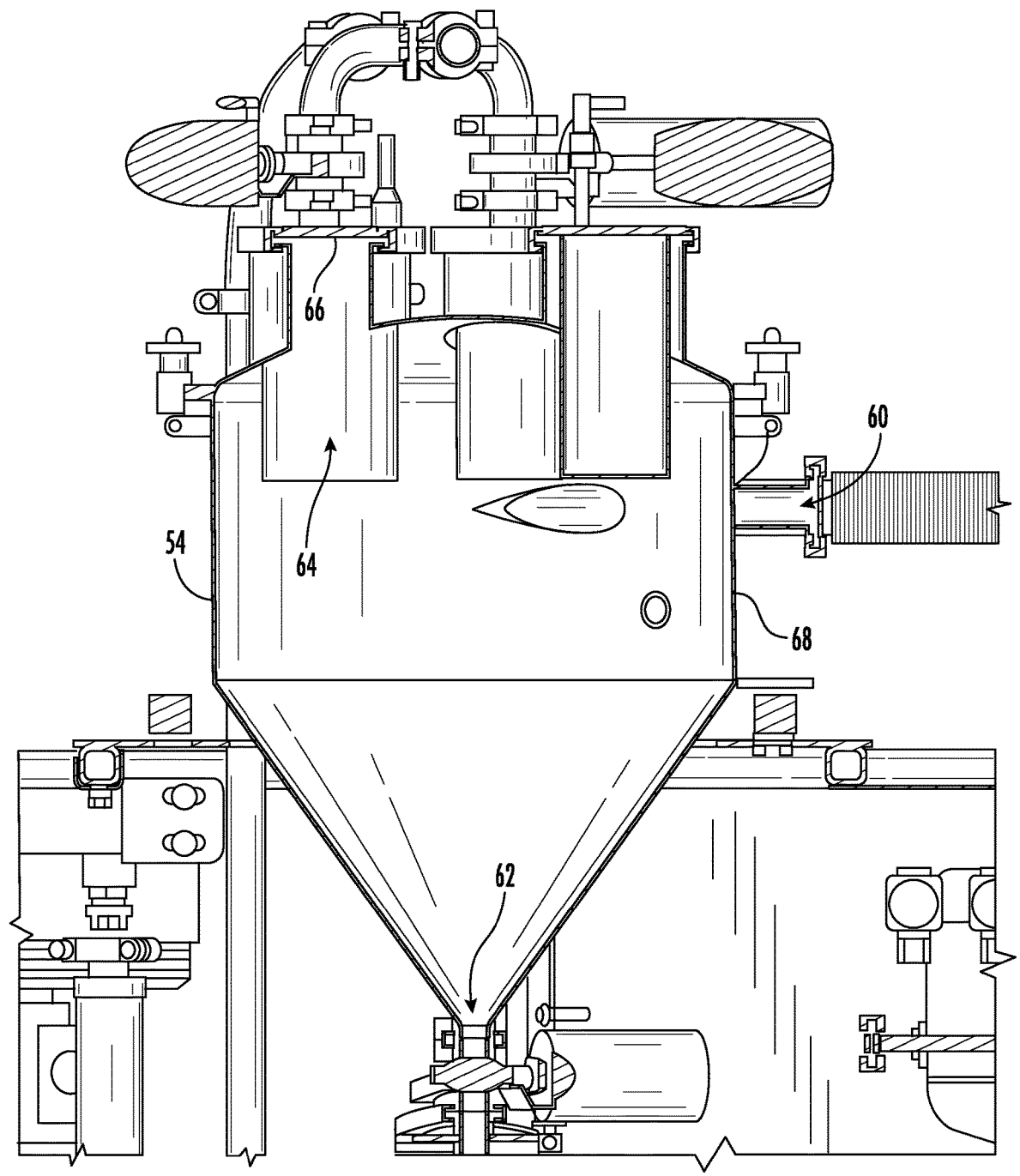
FIG. 13 is a perspective view of a raw reclaimed powder hopper that is part of a powder reclamation system, with a side cross-sectional view of the raw reclaimed powder hopper, in accordance with an exemplary embodiment of the present disclosure.

Referring now briefly also to FIG. 13, providing a side, cross-sectional view of the raw reclaimed powder hopper 54, the raw reclaimed powder hopper 54 is described in more detail. As shown, the raw reclaimed powder hopper 54 depicted defines a raw powder inlet 60, a raw powder outlet 62 in communication with the inlet 34 of the filter housing 32, and a carrier gas outlet 64. The reclamation passageway 50 extends to the raw powder inlet 60 of the raw reclaimed powder hopper 54. For the embodiment shown, the inlet 60 is positioned in a side of the raw reclaimed powder hopper 54 and oriented at an angle relative to a centerline of the raw reclaimed powder hopper 54 (see also, e.g., FIG. 2). In such a manner, an outer wall 68 of the raw reclaimed powder hopper 54 may act as a gravity-operated separator, such that the heavier powder falls to a bottom end of the raw reclaimed powder hopper 54 and the lighter carrier gas rises to a top end of the raw reclaimed powder hopper 54. In such a manner, it will further be appreciated that the carrier gas outlet 64 is positioned at a top end of the raw reclaimed powder hopper 54 and the powder outlet 62 is positioned at a bottom end of the raw reclaimed powder hopper 54.

The raw reclaimed powder hopper 54 also includes a powder filter 66 within the carrier gas outlet 64 for removing powder from a carrier gas flow through the carrier gas outlet 64. The powder filter 66 is configured to prevent or reduce any powder received through the raw powder inlet 60 of the raw reclaimed powder hopper 54 from passing through the carrier gas outlet 64 of the raw reclaimed powder hopper 54. The powder filter 66 is, for the embodiment depicted, formed of a metal material to reduce a contamination of any powder filtered out of the carrier gas by the powder filter 66. More specifically, it will be appreciated that for the exemplary system depicted, the powder 26 is formed of a material and the powder filter 66 is formed substantially of the same material (e.g., titanium or a titanium allow). Such may further reduce a risk of the powder 26 being contaminated.

It will be appreciated, however, that in other embodiments, the powder filter 66 may be formed of any other suitably material, such as a stainless steel material.

Further, it will be appreciated that for the embodiment depicted, the raw reclaimed powder hopper 54 includes a plurality of powder filters 66 arranged in parallel flow, and more specifically still includes four powder filters. Each of the plurality of powder filters 66 may be formed of a metal material to reduce a risk of contamination of the powder filtered out of the carrier gas.

Moreover, the powder filters 66 depicted are each in airflow communication with a high pressure gas source, such as a high pressure carrier gas source 180. The high pressure gas source may be configured to selectively flow high pressure gas in a direction opposite a normal gas flow direction through the filters 66. In such a manner, the high pressure gas source may be configured to "purge" the filters 66.

Referring back to FIGS. 1-2, as noted above, the reclamation system 10 further includes the filtered reclaimed powder hopper 56. The filtered reclaimed powder hopper 56 is in communication with the outlet 36 of the filter housing 32. As explained in greater detail above, the filter housing 32 receives the raw reclaimed powder from the raw reclaimed powder hopper 54, filters the powder to obtain a desired powder size distribution (e.g., separates a second portion 29 of the powder 26 from a first portion 27 of the powder 26) using a filter 14, and provides the second portion 29 of the powder 26 to the outlet 36 of the filter housing 32. The filtered reclaimed powder hopper 56 receives the second portion 29 of the powder 26, i.e., filtered reclaimed or recycled powder 29, that passes through the first filter 40 and the second filter 42. In one embodiment, a recirculation passageway 52 is in communication with the outlet 36 of the filter housing 32 and is configured to recirculate the second portion 29 of the powder 26 that passes through the first filter 40 and the second filter 42 back to the metal powder processing device 100. More specifically, for the embodiment shown, the recirculation passageway 52 is in communication with the filtered reclaimed powder hopper 56 and the metal powder processing device 100. In this manner, the recirculation passageway 52 provides a conduit or channel to recirculate the second portion 29 of the powder 26 collected within the filtered reclaimed powder hopper 56 back to the metal powder processing device 100.

A reclamation system and/or a sieving system assembly of the present disclosure can be configured to recirculate different sizes of powders and/or different types of powders back to a metal powder processing device 100.

Referring now back to the front and rear system views of FIGS. 1 and 2, in one embodiment, the powder reclamation system 10 of the present disclosure utilizes a carrier gas assembly 28 for generating a pressure drive system to move the powder 26 from the metal powder processing device 100 to the powder reclamation system 10 and throughout the powder reclamation system 10. The carrier gas assembly 28 includes a high pressure carrier gas source 180, and associated pressure drive system components, that provides and generates the pressure drive system. In exemplary embodiments, the carrier gas assembly 28 may introduce an argon gas or nitrogen gas pressure drive system throughout the powder reclamation system 10 of the present disclosure.

For the embodiment depicted, the carrier gas assembly 28 is in flow communication with the network of passageways 166 for providing the carrier gas into and through the network of passageways 166. In particular, the carrier gas assembly 28 may be configured to replace all gas within the powder reclamation system 10 with the carrier gas. As such, the carrier gas assembly 28 may generally include a carrier gas source, a carrier gas pump, one or more carrier gas valves, etc. In such a manner the carrier gas assembly 28 may provide pressurized carrier gas through the network of passageways 166, e.g., to assist with moving powder through the network of passageways 166.

Referring still to FIGS. 1 and 2, in an exemplary embodiment, a powder reclamation system 10, a powder sieving system assembly 12, and a broad frequency filter assembly 14 of the present disclosure include a powder mass control assembly 16. The powder mass control assembly 16 is configured to determine data indicative of a mass of the powder 26 on the broad frequency filter 14 and control one or more operations of the powder sieving system assembly 12 based on the determined data indicative of the mass of powder 26 on the broad frequency filter 14.

In the embodiment depicted, the powder mass control assembly 16 includes a first load cell 80, a second load cell 82, and a third load cell 84 for determining data indicative of a mass of the powder 26 on the broad frequency filter 14. The first load cell 80 is in communication with the raw reclaimed powder hopper 54 and the first load cell 80 is configured to measure data indicative of a first mass of powder 26 within the raw reclaimed powder hopper 54.

The second load cell 82 is in communication with the filtered reclaimed powder hopper 56 and the second load cell 82 is configured to measure data indicative of a second mass of powder 26 within the filtered reclaimed powder hopper 56.

The third load cell 84 is in communication with the oversized powder hopper 72 and the third load cell 84 is configured to measure data indicative of a third mass of powder 26 within the oversized powder hopper 72. The first load cell 80, the second load cell 82, and the third load cell 84 may be mounted at any suitable location to sense data indicative of a mass of powder within the respective hoppers. For example, the first load cell 80, the second load cell 82, and/or the third load cell 84 may be mounted to the support structure 30 supporting the respective hopper. Further, the first load cell 80, the second load cell 82, and the third load cell 84 may be configured as any suitable load cell capable of measuring data indicative of a mass of powder within the respective hoppers. Accordingly, it will be appreciated that the term "load cell" is meant to generically refer to any sensor capable to measuring data indicative of a mass of powder within a hopper. For example, the first load cell 80, the second load cell 82, and/or the third load cell 84 may include one or more of a strain gauge, a pneumatic load cell, a hydraulic load cell, piezoelectric load cell, etc.

The powder mass control assembly 16 is configured to determine data indicative of the mass of the powder 26 on the broad frequency filter 14 using the first load cell 80, the second load cell 82, and the third load cell 84.

For example, in at least certain exemplary embodiments the powder mass control assembly 16 may first sense data indicative of a mass of powder within the raw reclaimed powder hopper 54 prior to providing any raw reclaimed powder to the filter housing 32. The powder mass control assembly 16 may then provide a desired amount of raw reclaimed powder to the filter housing 32 and initiate operation of the vibration assembly 90. The powder mass control assembly 16 may periodically or continuously measure data indicative of a powder within the filtered reclaimed powder hopper 56 and oversized powder hopper 72 to estimate the amount of powder within the filter housing 32 and, e.g., on the first filter 40 of the broad frequency filter 14. The powder mass control assembly 16 may operate in an open loop control to maintain a desired mass of powder on the first filter 40 of the broad frequency filter 14.

For example, the powder mass control assembly 16 may control one or more operations of the powder sieving system assembly 12 based on the determined data indicative of the mass of powder 26 on the broad frequency filter 14. For example, the powder mass control assembly 16 may control a powder flow rate or amount from the raw reclaimed powder hopper 54 to the filter housing 32 based on the determined data indicative of the mass of powder 26 on the broad frequency filter 14. Additionally, or alternatively, the powder mass control assembly 16 may be configured to control an intensity, a frequency, or a combination thereof of the first and second motors 91, 92 of the vibration assembly 90 based on the determined data indicative of the mass of powder 26 on the broad frequency filter 14.

Referring to FIGS. 1 and 2, the powder mass control assembly 16 of the present disclosure provides mass control, e.g., load cells 80, 82, 84, above and below the broad frequency filter 14 to ensure for precise mass monitoring and control.

The broad frequency filter 14 of the present disclosure may operate more efficiently when a certain mass of powder 26 is on the first filter 40 of the broad frequency filter 14. Advantageously, the powder mass control assembly 16 of the present disclosure controls a mass of the powder 26 on the broad frequency filter 14 and ensures a desired mass of the powder 26 is on the broad frequency filter 14 during operation. Furthermore, the powder mass control assembly 16 controls one or more operations of the broad frequency filter 14 based on the determined mass of powder 26 on the broad frequency filter 14.

Referring now back to FIGS. 1 and 2, as briefly noted above, in an exemplary embodiment, a powder reclamation system 10 of the present disclosure includes a new or virgin powder assembly 20 for introducing a new or virgin powder 130 with a second portion 29 of powder 26, i.e., filtered reclaimed or recycled powder 29, that is smaller than the predetermined threshold and passes therethrough the broad frequency filter 16. Advantageously, a powder reclamation system 10 of the present disclosure including a new or virgin powder assembly 20 provides a system that is able to introduce and maintain a desired mix of filtered reclaimed powder 29 and virgin powder 130.

In an exemplary embodiment, the new or virgin powder assembly 20 includes a virgin powder hopper 132, a powder delivery line 134, and a controller 136. The virgin powder hopper 132 contains a virgin powder 130. The powder delivery line 134 is configured for providing a flow of powder to a metal powder processing device 100 (see also, FIG. 12). The powder delivery line 134 is in flow communication with the filtered reclaimed powder hopper 56 and the virgin powder hopper 132. In this manner, the filtered reclaimed powder hopper 56 containing the filtered reclaimed or recycled powder 29 and the virgin powder hopper 132 containing the virgin powder 130 are each in flow communication with the powder delivery line 134 for mixing of the filtered reclaimed powder 29 and the virgin powder 130 theretogether. In an exemplary embodiment, the virgin powder assembly 20 also includes a mixer that is in communication with the powder delivery line 134 and that is configured to mix the virgin powder 130 and the filtered reclaimed powder 29 theretogether.

More particularly, as is depicted in FIG. 1, the powder reclamation system 10 further comprises a plurality of valves for regulating a flow of powder to the powder delivery line 134. Specifically, the powder reclamation system 10 includes a filtered powder valve for regulating a flow of filtered powder from the filtered reclaimed powder hopper 56 to the powder delivery line 134 and a virgin powder valve for regulating a flow of virgin powder from the virgin powder hopper 132 to the powder delivery line 134. The filtered powder valve and the virgin powder valve may each be in operable communication with a controller 136 to selectively provide filtered powder and virgin powder to the powder delivery line 134, and to the metal powder processing device. In one exemplary embodiment, the controller 136 is operably coupled to a pressurized carrier gas source for providing the mixture of the filtered reclaimed powder 29 and the virgin powder 130 through the powder delivery line 134. The controller 136 is operably coupled to the filtered powder valve and the virgin powder valve for providing the mixture of the filtered reclaimed powder and the virgin powder through the powder delivery line 134. For example, the controller 136 is configured to sequentially open the filtered powder valve and the virgin powder valve to provide the mixture of the filtered reclaimed powder and the virgin powder through the powder delivery line 134.

For example, in certain exemplary embodiments, the powder reclamation system 10 may be configured to sequentially provide powder 29 from the filtered reclaimed powder hopper 56 and from the virgin powder hopper 132 to ensure the powder provided to the metal powder processing device 100 has a desired mixture of filtered reclaimed powder 29 and virgin powder 130.

By way of example only, if ten (10) units of powder are desired to be provided to the metal powder processing device 100, with an overall composition of 6 units of reclaimed filtered powder 29, and 4 units of virgin powder 130, the powder reclamation system 10 of the present disclosure may sequentially provide powder from the filtered reclaimed powder hopper 56 and from the virgin powder hopper 132 to provide the desire amount and composition of powder. For example, the powder reclamation system 10 may sequentially provide two (2) units of powder from the filtered reclaimed powder hopper 56 and one (1) unit of powder from the virgin powder hopper 132 until a desired amount of powder is provided to the metal powder processing device 100. With such an exemplary embodiment, the powder reclamation system 10 may go through multiple rounds in order to provide the desired amount of powder to the metal powder processing device 100. For example, the powder reclamation system 10 may go through at least two rounds, such as at least three rounds, such as up to one hundred rounds.

By providing the powder in multiple rounds of these sequentially or alternating ratios, the powder may have a desired substantially homogenous mixture within the hopper of the metal powder processing device 100.

It will be appreciated that although the above-described powder reclamation system 10 is described as being operable with a single metal powder processing device, in other embodiments, the powder reclamation system 10 of the present disclosure may additionally or alternatively be operable with a plurality of metal powder processing devices. For example, referring now to FIG. 19, in an exemplary embodiment, a powder reclamation system 10 of the present disclosure includes a multiple metal powder processing device attachment assembly 22 for allowing the powder reclamation system 10 to connect to and recover powder from a plurality of metal powder processing devices.

Figure 19:
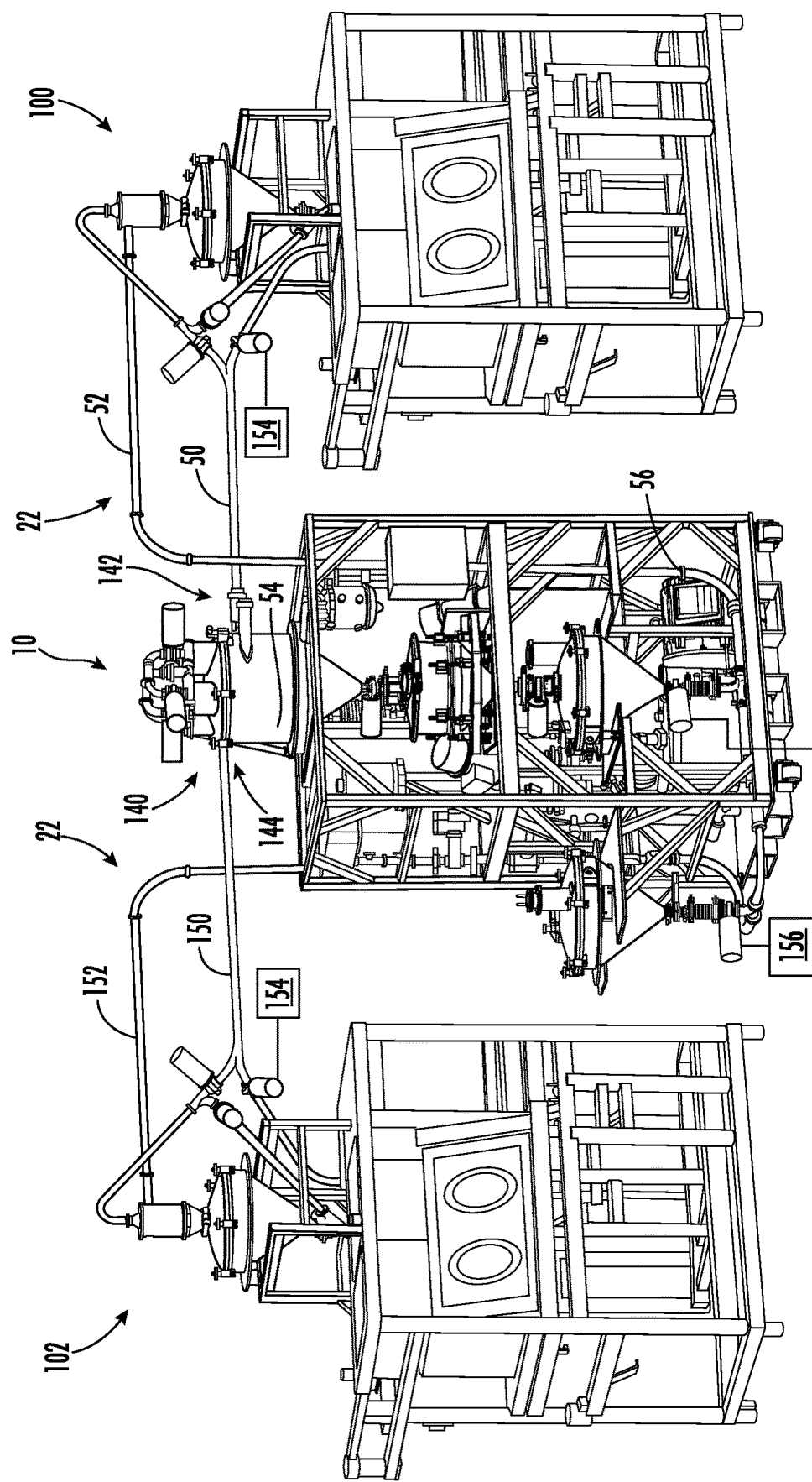
FIG. 19 is a perspective view of a powder reclamation system in communication with a first metal powder processing device and a second metal powder processing device in accordance with another exemplary embodiment of the present disclosure.

A powder reclamation system 10 of the present disclosure may be operable with a plurality of metal powder processing devices in a variety of different configurations, such as in series, in parallel, or in other hybrid configurations. For example, in one exemplary embodiment, a powder reclamation system 10 can be directly connected to a plurality of metal powder processing devices as shown in FIG. 19. In other exemplary embodiments, a powder reclamation system 10 can be directly connected to a first metal powder processing device and indirectly connected to a second metal powder processing device which is directly connected to the first metal powder processing device. In other words, a powder reclamation system 10 can be connected to a first metal powder processing device which is connected to a second metal powder processing device in a series configuration.

In an exemplary embodiment, the multiple metal powder processing device attachment assembly 22 includes a multi-source input attachment system 140 having a first connection portion 142 for connecting the powder reclamation system 10 to a first metal powder processing device 100 and a second connection portion 144 for connecting the powder reclamation system 10 to a second metal powder processing device 102. Although FIG. 19 illustrates the powder reclamation system 10 connected with a first and second metal powder processing device 100, 102, it is contemplated that the multiple metal powder processing device attachment assembly 22 of the present disclosure can be used to connect any number of metal powder processing devices to a powder reclamation system 10 of the present disclosure.

In an exemplary embodiment, a powder reclamation system 10 of the present disclosure includes a first reclamation passageway 50 and a second reclamation passageway 150. For example, referring to FIG. 19, the first reclamation passageway 50 is in communication with the raw reclaimed powder hopper 54 and a first metal powder processing device 100 via the first connection portion 142 of the multi-source input attachment system 140. The first reclamation passageway 50 is configured to recover a first unused portion of a first powder from the first metal powder processing device 100 to the raw reclaimed powder hopper 54.

Referring to FIG. 19, the second reclamation passageway 150 is in communication with the raw reclaimed powder hopper 54 and a second metal powder processing device 102 via the second connection portion 144 of the multi-source input attachment system 140. The second reclamation passageway 150 is configured to recover a second unused portion of a second powder from the second metal powder processing device 102 to the raw reclaimed powder hopper 54. In this manner, both of the first unused portion of a first powder from the first metal powder processing device 100 and the second unused portion of a second powder from the second metal powder processing device 102 reach the raw reclaimed powder hopper 54. Next, the first powder and the second powder go through a filtering process with the broad frequency filter 14 as described herein. The broad frequency filter 14 is configured to restrict a first portion of the first and second powders larger than a predetermined threshold from reaching the outlet 36 of the filter housing 32 and to allow a second portion of the first and second powders smaller than the predetermined threshold to pass through the first filter 40, the second filter 42, and the outlet 36 of the filter housing 32. Next, the second portion of the first and second powders is received within the filtered reclaimed powder hopper 56 in communication with the outlet 36 of the filter housing 32.

It is also contemplated that the broad frequency filter 14 may include a separator that is configured to separate a first portion of the first and second powders from a second portion of the first and second powders. For example, the broad frequency filter 14 including a separator, in addition to being able to filter by powder sizes, may also be able to separate based on different types of powders, to remove clumps, and/or other separation criteria.

In an exemplary embodiment, a powder reclamation system 10 of the present disclosure includes a first recirculation passageway 52 and a second recirculation passageway 152. For example, referring to FIG. 19, the first recirculation passageway 52 is in communication with the filtered reclaimed powder hopper 56 and the first metal powder processing device 100. The first recirculation passageway 52 is configured to recirculate a first part of the second portion of the first and second powders back to the first metal powder processing device 100.

Referring to FIG. 19, the second recirculation passageway 152 is in communication with the filtered reclaimed powder hopper 56 and the second metal powder processing device 102. The second recirculation passageway 152 is configured to recirculate a second part of the second portion of the first and second powders back to the second metal powder processing device 102.

Furthermore, in an exemplary embodiment, the multiple metal powder processing device attachment assembly 22 includes a controller 154 that is in communication with a portion of the powder reclamation system 10 and/or the metal powder processing devices. For example, in one embodiment, the controller 154 is in communication with the raw reclaimed powder hopper 54 and/or the metal powder processing devices. The controller 154 is operable to control an amount of the first unused portion of the first powder that is recovered from the first metal powder processing device 100 to the raw reclaimed powder hopper 54 and control an amount of the second unused portion of the second powder that is recovered from the second metal powder processing device 102 to the raw reclaimed powder hopper 54.

In an exemplary embodiment, the multiple metal powder processing device attachment assembly 22 also includes a second controller 156 that is in communication with a portion of the powder reclamation system 10 and/or the metal powder processing devices. For example, in one embodiment, the second controller 156 is in communication with the virgin powder hopper 132 and/or the metal powder processing devices. The second controller 156 is operable to selectively dose the second portion of the first and second powders with the virgin powder 130 at a location upstream of the first and second metal powder processing devices 100, 102.

More particularly, as is depicted in FIG. 19, the powder reclamation system 10 including a multiple metal powder processing device attachment assembly 22 further includes a plurality of valves for regulating a flow of powder from the metal powder processing devices and back to the metal powder processing devices. Specifically, the powder reclamation system 10 includes a reclamation valve for regulating a flow of a recovered first powder from the first metal powder processing device 100 to the raw reclaimed powder hopper 54 via the first reclamation passageway 50 and regulating a flow of a recovered second powder from the second metal powder processing device 102 to the raw reclaimed powder hopper 54. The system 10 also includes a recirculation valve for regulating a flow of a recirculated first part of the second portion of the first and second powders back to the first metal powder processing device 100 via the first recirculation passageway 52 and regulating a flow of a recirculated second part of the second portion of the first and second powders back to the second metal powder processing device 102 via the second recirculation passageway 152. The reclamation valve and the recirculation valve may each be in operable communication with a controller 154, 156 to selectively recover powder from the metal powder processing devices 100, 102 and to selectively recirculate powder back to the metal powder processing devices 100, 102. In one exemplary embodiment, the controllers 154, 156 are operably coupled to a pressurized carrier gas source for recovering powder from the metal powder processing devices 100, 102 and for recirculating powder back to the metal powder processing devices 100, 102.

Furthermore, the controllers 154, 156 of the multiple metal powder processing device attachment assembly 22 can provide different pressures of a carrier gas flow through the respective passageways, e.g., the first reclamation passageway 50, the second reclamation passageway 150, the first recirculation passageway 52, and the second recirculation passageway 152, coupling the powder reclamation system 10 to respective metal powder processing devices 100, 102.

The controllers 154, 156 of the multiple metal powder processing device attachment assembly 22 can also reclaim powder simultaneously from multiple metal powder processing devices, or sequentially. Additionally, the controllers 154, 156 of the multiple metal powder processing device attachment assembly 22 can also recirculate or provide powder simultaneously to multiple metal powder processing devices, or sequentially.

In an exemplary embodiment of the present disclosure, the passageways of respective portions of the multiple metal powder processing device attachment assembly 22 of a powder reclamation system 10 may include different configurations, sizes, and dimensions. For example, the first reclamation passageway 50 defines a first cross-sectional area and the second reclamation passageway 150 defines a second cross-sectional area. In one embodiment, the first cross-sectional area of the first reclamation passageway 50 is different than the second cross-sectional area of the second reclamation passageway 150. In some embodiments, the first cross-sectional area of the first reclamation passageway 50 may be the same as the second cross-sectional area of the second reclamation passageway 150. Furthermore, the first reclamation passageway 50 defines a first length and the second reclamation passageway 150 defines a second length. In one embodiment, the second length of the second reclamation passageway 150 is greater than the first length of the first reclamation passageway 50, and the first cross-sectional area is less than the second cross-sectional area. Thus, in some embodiments, the sizes, lengths, and dimensions of the first reclamation passageway 50 and the second reclamation passageway 150 are different.

Furthermore, as noted above, the powder reclamation system 10 may be utilized to reclaim, filter, and distribute reactive metal powders to one or more metal powder processing devices. As such, it may be beneficial to include features to ensure an internal environment of the powder reclamation system 10 is sufficiently devoid of oxygen to prevent an undesirable reaction between the powder and oxygen.

Specifically, referring still to FIGS. 1 and 2, in an exemplary embodiment, a powder reclamation system 10 of the present disclosure includes an oxygen sensing assembly 24 of the present disclosure that monitors an amount of oxygen within the powder reclamation system 10 of the present disclosure. The oxygen sensing assembly 24 of the present disclosure includes a sensor for monitoring the amount of oxygen within the powder reclamation system 10 and the oxygen sensing assembly 24 is configured to initiate a corrective action in response to receiving data indicative of the amount of oxygen within the powder reclamation system 10 exceeding a predetermined threshold.

In an exemplary embodiment, the oxygen sensing assembly 24 of the present disclosure includes a sensor assembly 24 that is in communication with a portion of the powder reclamation system 10 and the powder sieving system 12. The sensor assembly 24 is configured to monitor an amount of oxygen within a network of passageways 166 of the powder reclamation system 10. For example, in one exemplary embodiment, the network of passageways 166 include the reclamation passageways 50, 150, the recirculation passageways 52, 152, the raw reclaimed powder hopper 54, the filtered reclaimed powder hopper 56, the oversized powder hopper 72, the virgin powder hopper 132, the multi-source input attachment system 140, and/or other connecting passageways throughout the powder reclamation system 10.

As described above, in one embodiment, the powder reclamation system 10 of the present disclosure utilizes a carrier gas assembly 28 for generating a pressure drive system to move a powder 26 from a metal powder processing device 100 to the powder reclamation system 10 and throughout the powder reclamation system 10. In exemplary embodiments, the carrier gas assembly 28 may introduce an argon gas or nitrogen gas pressure drive system throughout the powder reclamation system 10 of the present disclosure.

In this manner, the carrier gas assembly 28 provides a pressure drive system for moving a powder 26 through the network of passageways 166 of the powder reclamation system 10 that is configured to recover a powder 26 from a machine 100, to move a powder 26 to the filter housing 32 for filtering, and to recirculate a portion of the powder 26 that passes through the filter housing 32 back to the machine 100.

In one exemplary embodiment, the sensor assembly 24 includes a first sensor 162 and a second sensor 164. The first sensor 162 is in communication with a portion of the powder sieving system 12. For example, referring to FIGS. 1 and 13, the first sensor 162 is in communication with a portion of the broad frequency filter 14, e.g., the filter housing 32. The first sensor 162 is configured to monitor an amount of oxygen within the network of passageways 166.

The second sensor is in communication with a second portion of the powder sieving system 12. For example, referring to FIG. 1, the second sensor 164 is in communication with a portion of the raw reclaimed powder hopper 54. The second sensor 164 is spaced apart from the first sensor 162; and the second sensor 164 is configured to monitor the amount of oxygen within the network of passageways 166.

In one embodiment, the first sensor 162 and the second sensor 164 are optical sensors. More specifically, referring now to FIG. 3, providing a close-up, view of the first sensor 162, the first sensor generally sends lasers to detect an oxygen level throughout a powder reclamation system 10 of the present disclosure. In this manner, the sensors 162, 164 do not heat up air which may be dangerous because of the powder 26 therein.

As described above, a powder 26 that is recovered, filtered, and recirculated by a powder reclamation system 10 of the present disclosure may be reactive with oxygen. Advantageously, the oxygen sensing assembly 24 of the present disclosure monitors an amount of oxygen within the powder reclamation system 10 of the present disclosure to prevent a powder 26 from reacting with oxygen. Additionally, by having optical sensors, the sensors 162, 164 send lasers to detect an oxygen level throughout a powder reclamation system 10 of the present disclosure. In this manner, the sensors 162, 164 do not heat up air which is dangerous because of the powder 26 therein.

As noted, the powder reclamation system may be configured to initiate a corrective action in response to receiving data indicative of an oxygen content being above a predetermined oxygen threshold.

In an exemplary embodiment, the oxygen sensing assembly 24 includes a controller 174 that is operably coupled to the sensor assembly 24, e.g., the first sensor 162, for receiving data indicative of the amount of oxygen within the network of passageways 166 from the first sensor 162. The controller 174 of the oxygen sensing assembly 24 is configured to initiate a corrective action in response to receiving data indicative of the amount of oxygen within the network of passageways 166 being above a predetermined oxygen threshold. In one exemplary embodiment, the predetermined oxygen threshold is a 4% oxygen content within the network of passageways 166 of the powder reclamation system 10. In another exemplary embodiment, the predetermined oxygen threshold is a 1% oxygen content within the network of passageways 166 of the powder reclamation system 10.

In one embodiment, the controller 174 of the oxygen sensing assembly 24 initiates a corrective action by shutting down a powder flow within the network of passageways 166. Furthermore, the controller 174 of the oxygen sensing assembly 24 initiates a corrective action by providing additional carrier gas to the network of passageways 166.

In some exemplary embodiments, the first sensor 162, the second sensor 164, and the controller 174 of the oxygen sensing assembly 24 are configured to shut down a powder flow throughout the powder reclamation system 10 if the amount of oxygen detected within the network of passageways 166 exceeds 4 percent. In another embodiment, the first sensor 162, the second sensor 164, and the controller 174 of the oxygen sensing assembly 24 are configured to shut down a powder flow throughout the powder reclamation system 10 if the amount of oxygen detected within the network of passageways 166 exceeds 1 percent.

In exemplary embodiments, the sensor assembly 24 may include additional sensors. For example, referring to FIG. 1, the sensor assembly 24 may include a third sensor 168, a fourth sensor 170, and a fifth sensor 172. For example, referring to FIG. 1, the first sensor 162 is in communication with a first portion of the powder sieving system 12 and the second sensor 164 is in communication with a second portion of the of the powder sieving system 12, e.g., raw reclaimed powder hopper 54. In this manner, the second sensor 164 is spaced apart from the first sensor 162. Furthermore, in one exemplary embodiment, the third sensor 168 is in communication with a portion of the filtered reclaimed powder hopper 56. The third sensor 168 is also configured to monitor the amount of oxygen within the network of passageways 166. The fourth sensor 170 is in communication with a portion downstream of the virgin powder hopper 132. The fourth sensor 170 is also configured to monitor the amount of oxygen within the network of passageways 166. The fifth sensor 172 is in communication with a portion of the oversized powder hopper 72. The fifth sensor 172 is also configured to monitor the amount of oxygen within the network of passageways 166.

It will be appreciated that in other exemplary embodiments of the present disclosure, the above-described powder reclamation system may have any other suitable configurations. For example, in other exemplary embodiments, a powder reclamation system of the present disclosure may be compatible with other filter assemblies. For example, although a filter assembly of the present disclosure is described as a broad frequency filter, it is contemplated that other filters and filter assemblies may be utilized with the system of the present disclosure.

Moreover, it will be appreciated that in certain exemplary embodiments, the sieving system assembly described herein may not be incorporated into a powder reclamation system, and instead may be a stand-alone sieving system utilized in, e.g., powder manufacturing to obtain desired powder size distributions.

Figure 14:
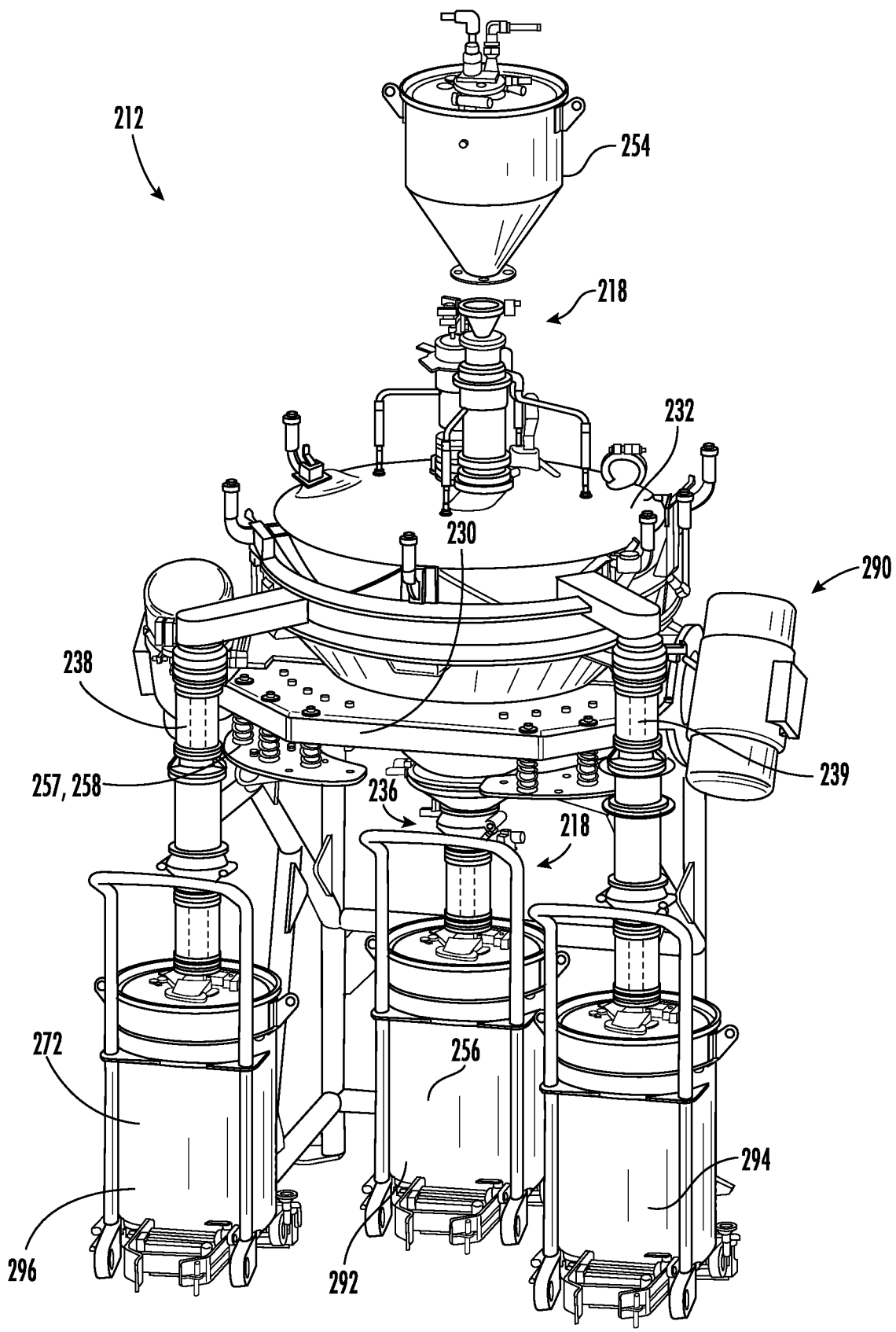
FIG. 14 is a perspective view of a powder sieving system in accordance with an exemplary embodiment of the present disclosure.
Figure 15:
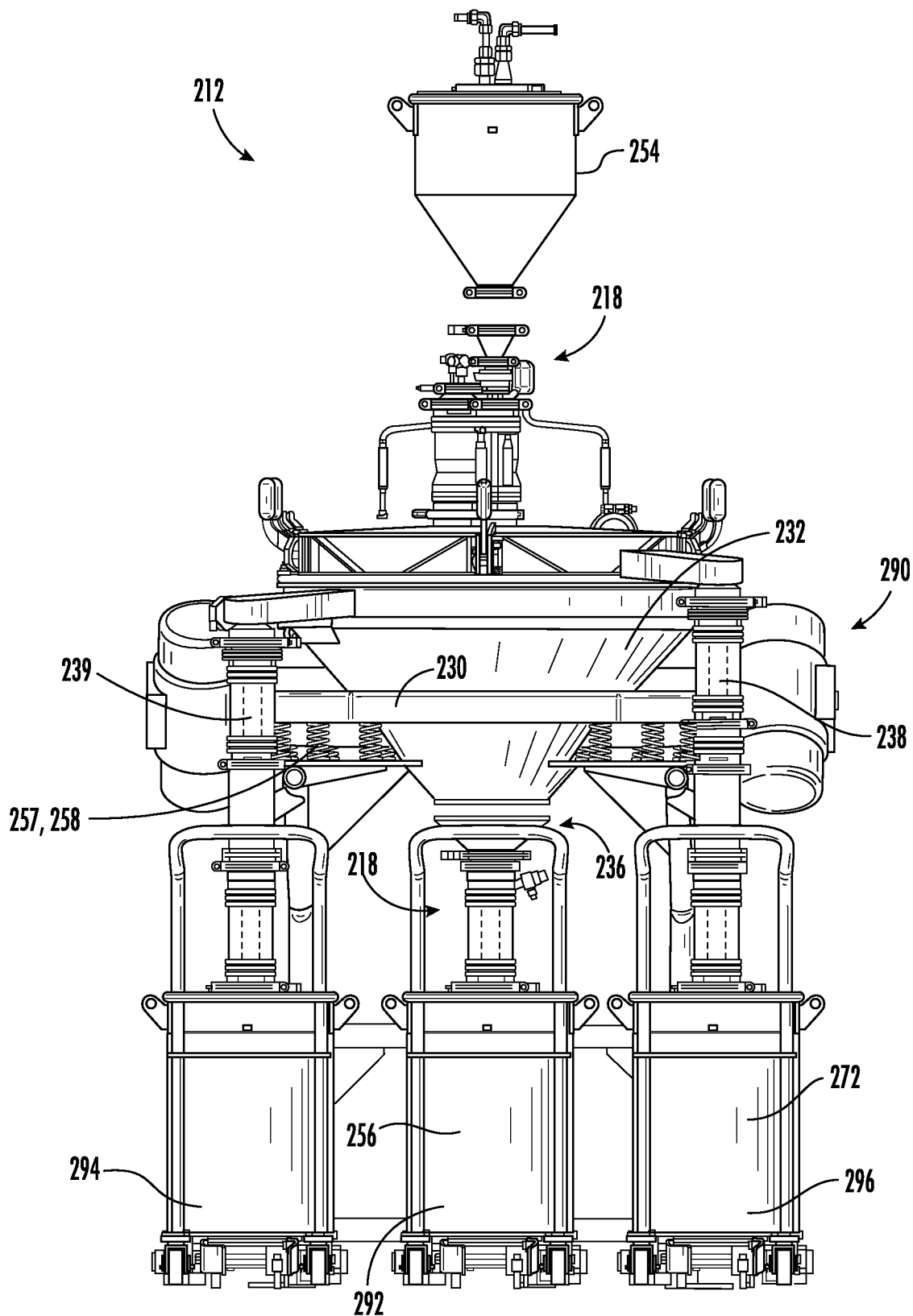
FIG. 15 is a side perspective view of a powder sieving system in accordance with an exemplary embodiment of the present disclosure.

For example, referring now to FIGS. 14 and 15, a perspective view and straight-on view of a sieving system assembly 212 in accordance with the present disclosure is provided. The exemplary sieving system assembly 212 depicted in FIGS. 14 and 15 may be configured in substantially the same manner as the exemplary sieving system assembly 12 described above as being incorporated into a powder reclamation system 10. For example, the exemplary sieving system assembly 212 depicted includes a raw powder hopper 254 (which in the embodiments of the powder reclamation system 10 is a raw reclaimed powder hopper 54); a filter housing 232 moveable relative to a support structure 230 by a vibration assembly 290; a filtered powder hopper 256 (which in the embodiments of the powder reclamation system 10 is a filtered reclaimed powder hopper 56); an oversized powder hopper 272; a powder isolation assembly 218 connecting the raw powder hopper 254 to the filter housing 232, the filter housing 232 to the filtered powder hopper 256, and the filter housing 232 to the oversized powder hopper 272; and a mechanical isolation assembly 257 (having one or more dampers or springs 258 mechanically isolating the filter housing 232 relative to the support structure 230 during operation of the vibration assembly 290). Further, although not depicted, the sieving system assembly 212 may further include a powder mass control system, an oxygen sensing system, etc., such as the systems 14, 16, 20, 24 described in detail above.

It will be appreciated, however, that for the exemplary sieving system assembly 212 depicted, the sieving system 212 is configured to separate the raw powder into multiple powder distribution sizes. In particular, the exemplary sieving system assembly 212 includes a fine filtered powder hopper 292 for powder below a lower threshold; a middle filtered powder hopper 294 for powder within a size distribution range greater than the lower threshold; and a course filtered powder hopper 296 for powder larger than the size distribution range greater than the lower threshold. It is also contemplated that other configurations of separating raw powder into multiple powder distribution sizes including any number of different sized filtered hoppers may be included with a sieving system 212 of the present disclosure.

Figure 16:
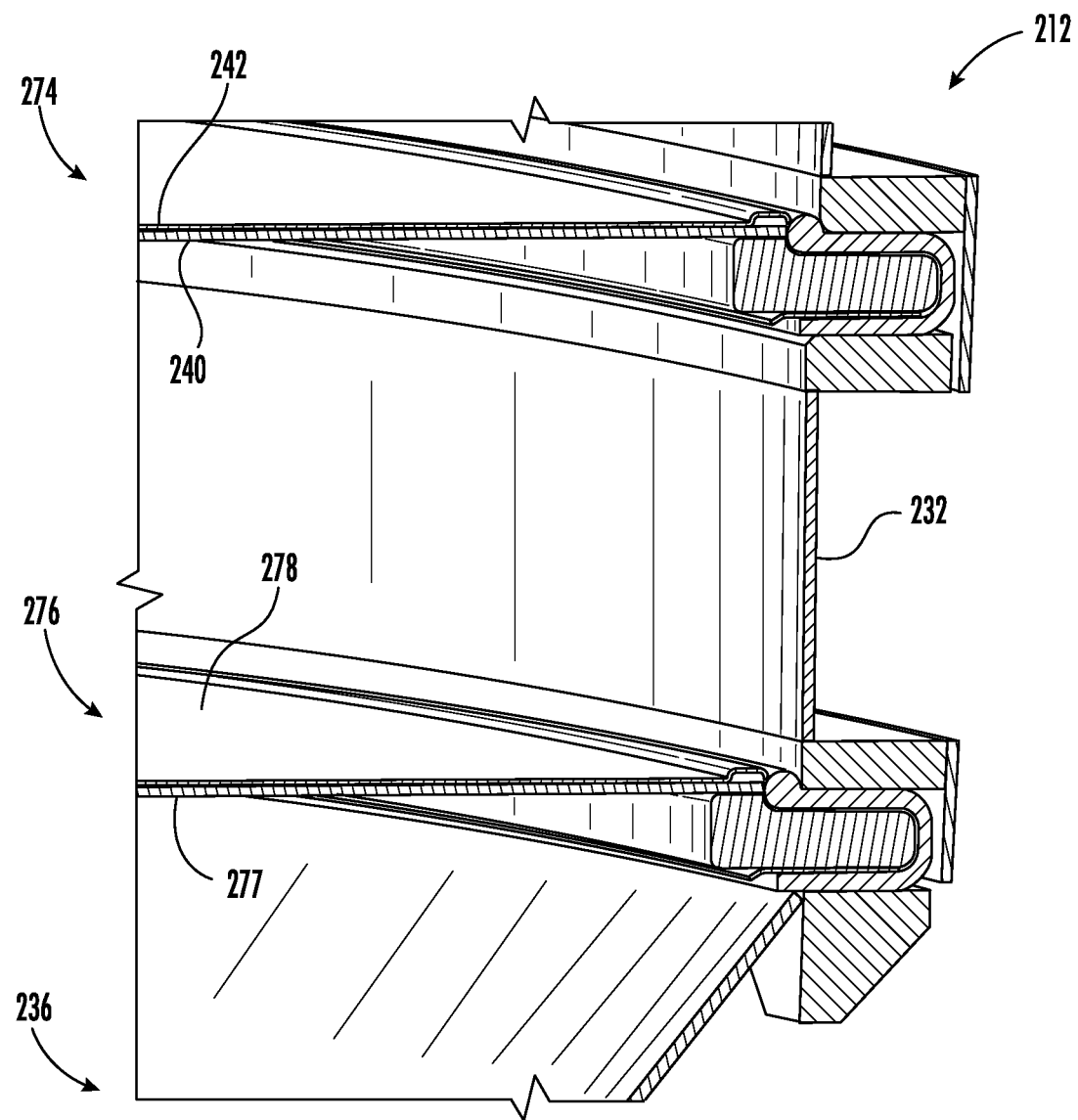
FIG. 16 is a cross-sectional view of a broad frequency filter having a first filter assembly and a second filter assembly in accordance with another exemplary embodiment of the present disclosure.

Specifically, referring now also to FIG. 16, providing a close-up, cross-sectional view of a portion of the filter housing 232 of a sieving system assembly 212, the filter housing 232 includes a first broad frequency filter assembly 274 including a first filter 240 and second filter 242 and a second broad frequency filter assembly 276 also including a first filter 277 and a second filter 278. The first broad frequency filter assembly 274 is spaced apart from the second broad frequency filter assembly 276 and allows a sieving system assembly 212 of the present disclosure to provide multiple stages of filtering. For example, the first set of filters 274 define a first pore size and the second set of filters 276 define a second pore size. In one embodiment, the second pore size is greater than the first pore size.

Figure 17:
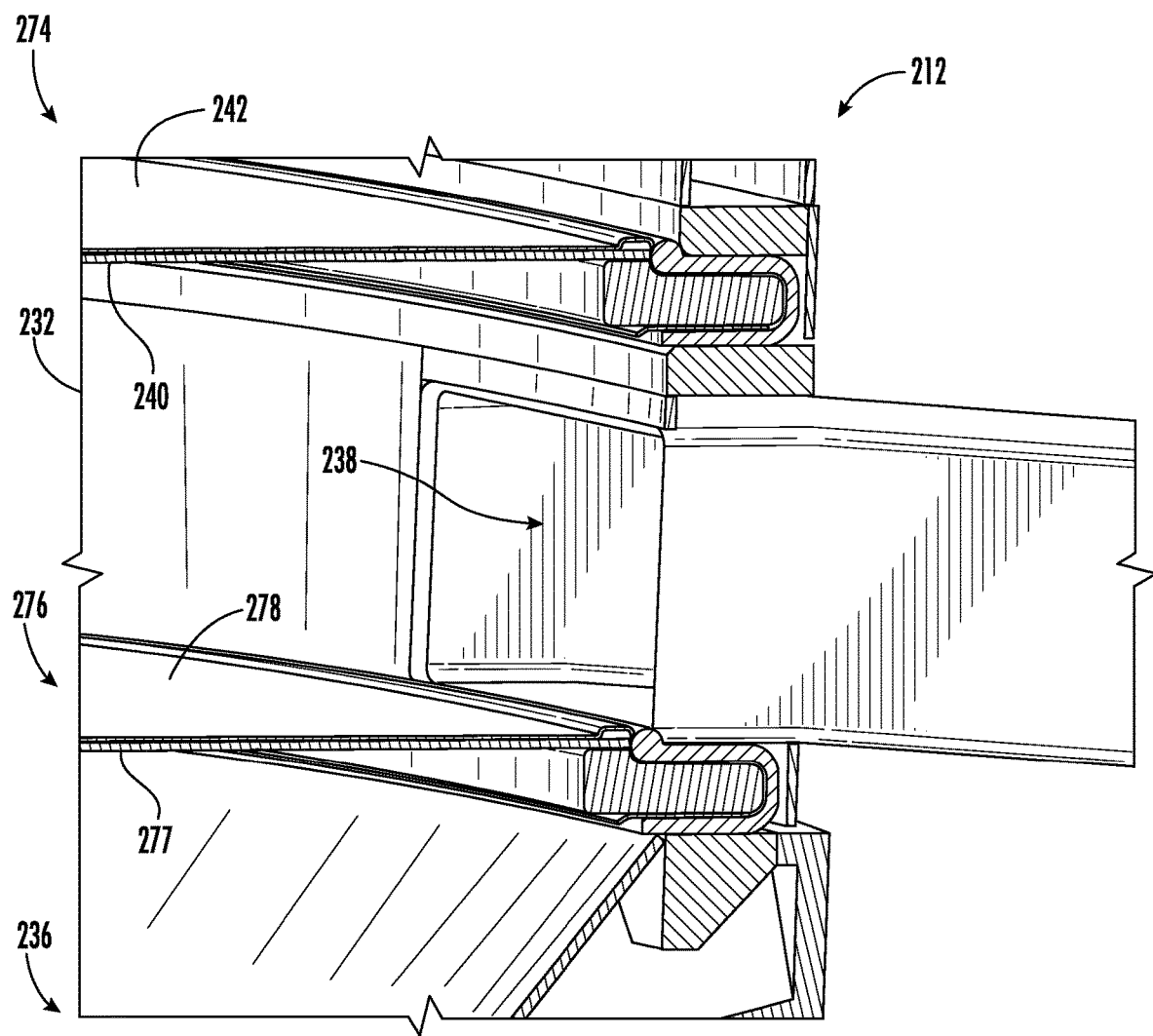
FIG. 17 is a cross-sectional view of a second portion of a broad frequency filter having a first filter assembly and a second filter assembly in accordance with another exemplary embodiment of the present disclosure.

In an exemplary embodiment, the outlet 236 of the filter housing 232 is a first outlet 236 and the filter housing 232 further defines a second outlet 238 and a third outlet 239. As described above, the broad frequency filter 214 includes a first set of filters, e.g., a first broad frequency filter assembly 274, and a second set of filters, e.g., a second broad frequency filter assembly 276. The first outlet 236 is positioned downstream of the first and second sets of filters 274, 276, the second outlet 238 is positioned upstream of the first set of filters 276 and downstream of the second set of filters 274, and the third outlet 239 is positioned upstream of the first and second sets of filters 274, 276. FIG. 17 shows the second outlet 238 that is located between the first set of filters 274 and the second sets of filters 276.

Figure 20:
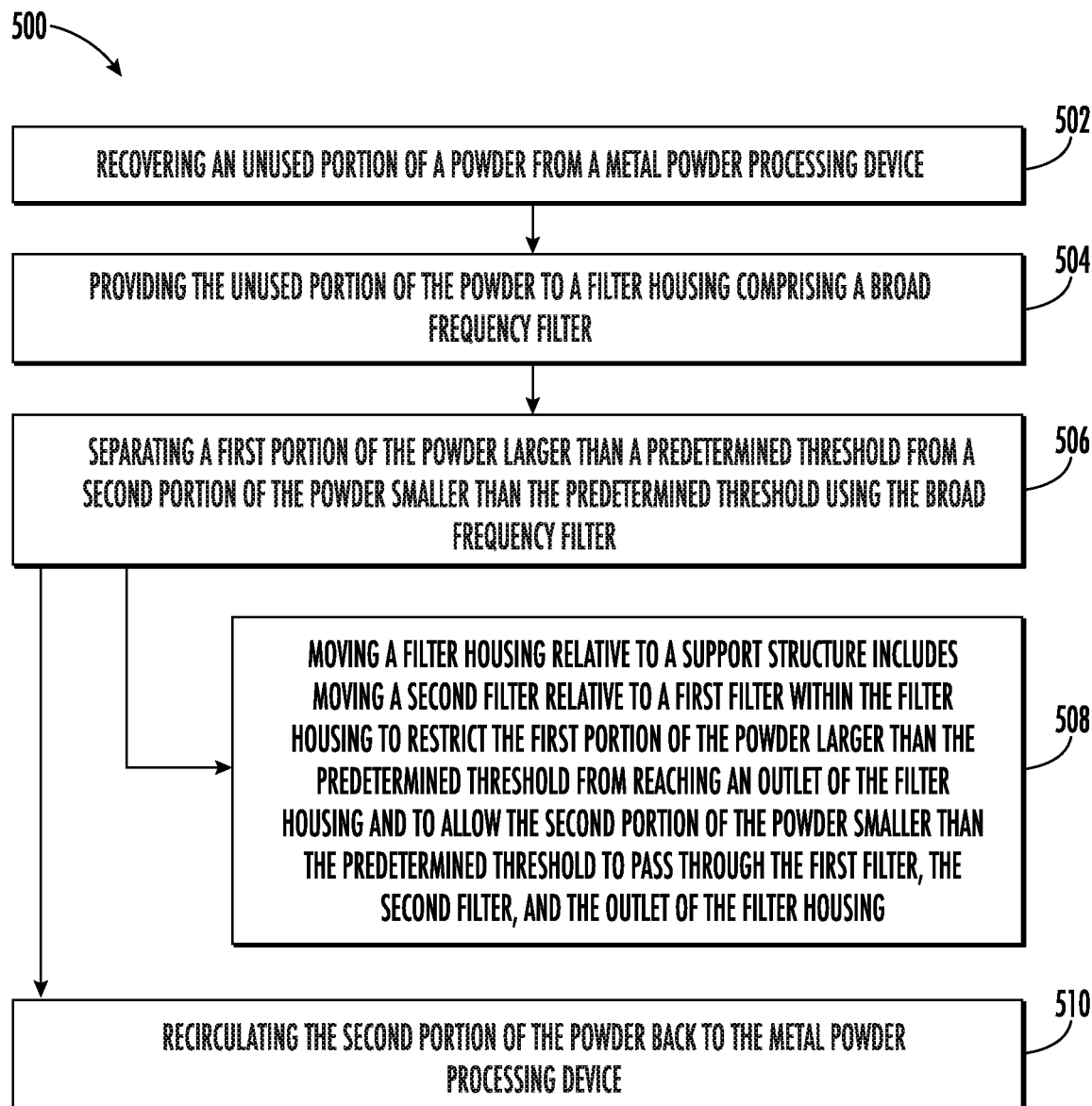
FIG. 20 is a flow diagram of a method of reclaiming powder in accordance with an exemplary aspect of the present disclosure.

Referring now to FIG. 20, a method 500 of reclaiming powder in accordance with an exemplary aspect of the present disclosure is depicted. The exemplary method 500 may be utilized to operate one or more of the exemplary powder reclamation systems and/or sieving systems described above with reference to FIGS. 1 through 19.

For the exemplary aspect of FIG. 20, the method 500 generally includes at (502) recovering an unused portion of a powder from a metal powder processing device.

The method 500 further includes at (504) providing the unused portion of the powder to a broad frequency filter as described in detail above with reference to one or more of the exemplary powder reclamation systems and/or sieving systems described above with reference to FIGS. 1 through 19.

For the exemplary aspect depicted, the method 500 further includes at (506) separating a first portion of the powder larger than a predetermined threshold from a second portion of the powder smaller than the predetermined threshold using the broad frequency filter. For the exemplary aspect depicted, separating the first portion of the powder larger than the predetermined threshold from the second portion of the powder smaller than the predetermined threshold using the broad frequency filter includes at (508) moving the filter housing relative to the support structure and simultaneously moving the second filter relative to the first filter within the filter housing to restrict the first portion of the powder larger than the predetermined threshold from reaching the outlet of the filter housing and to allow the second portion of the powder smaller than the predetermined threshold to pass through the first filter, the second filter, and the outlet of the filter housing.

The method 500 further includes at (510) recirculating the second portion of the powder back to the metal powder processing device.

Figure 21:
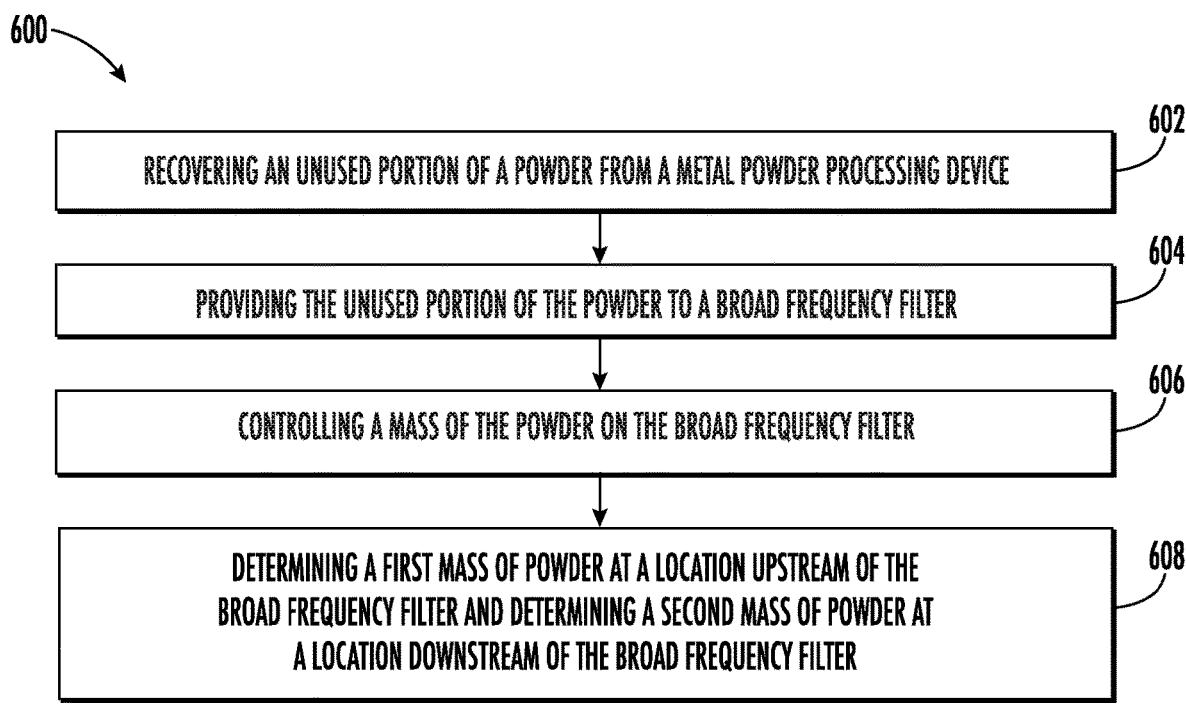
FIG. 21 is a flow diagram of a method reclaiming powder in accordance with another exemplary aspect of the present disclosure.

Referring now to FIG. 21, a method 600 of reclaiming powder in accordance with another exemplary aspect of the present disclosure is depicted. The exemplary method 600 may be utilized to operate one or more of the exemplary powder reclamation systems and/or sieving systems described above with reference to FIGS. 1 through 19.

For the exemplary aspect of FIG. 21, the method 600 generally includes at (602) recovering an unused portion of a powder from a metal powder processing device.

The method 600 further includes at (604) providing the unused portion of the powder to a broad frequency filter as described in detail above with reference to one or more of the exemplary powder reclamation systems and/or sieving systems described above with reference to FIGS. 1 through 19.

For the exemplary aspect depicted, the method 600 further includes at (606) controlling a mass of the powder on the broad frequency filter. In a first exemplary aspect depicted, controlling the mass of the powder on the broad frequency filter includes at (608) determining a first mass of powder at a location upstream of the broad frequency filter and determining a second mass of powder at a location downstream of the broad frequency filter.

Figure 22:
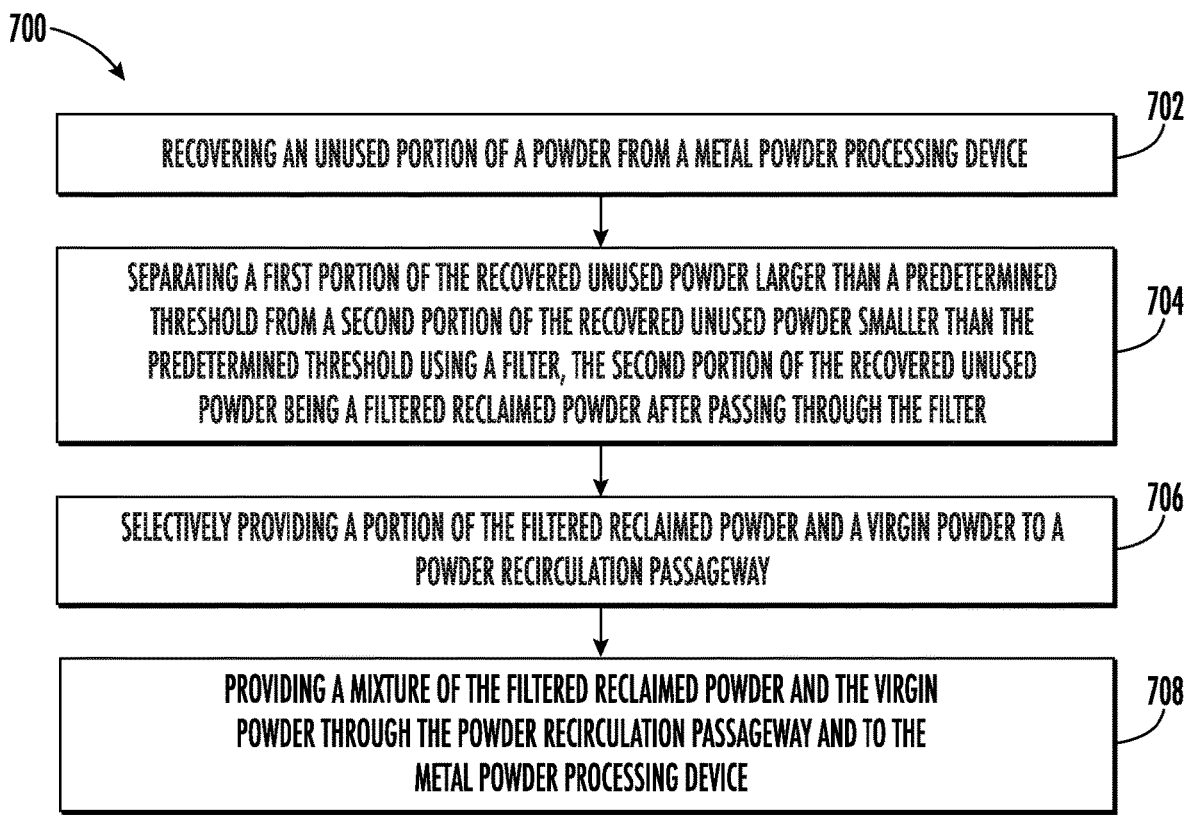
FIG. 22 is a flow diagram of a method of reclaiming powder in accordance with another exemplary aspect of the present disclosure.

Referring now to FIG. 22, a method 700 of reclaiming powder in accordance with an exemplary aspect of the present disclosure is depicted. The exemplary method 700 may be utilized to operate one or more of the exemplary powder reclamation systems and/or sieving systems described above with reference to FIGS. 1 through 19.

For the exemplary aspect of FIG. 22, the method 700 generally includes at (702) recovering an unused portion of a powder from a metal powder processing device.

The method 700 further includes at (704) separating a first portion of the recovered unused powder larger than a predetermined threshold from a second portion of the recovered unused powder smaller than the predetermined threshold using a filter, the second portion of the recovered unused powder being a filtered reclaimed powder after passing through the filter.

The method 700 further includes at (706) selectively providing a portion of the filtered reclaimed powder and a virgin powder to a powder recirculation passageway.

The method 700 further includes at (708) providing a mixture of the filtered reclaimed powder and the virgin powder through the powder recirculation passageway and to the metal powder processing device.

Figure 23:
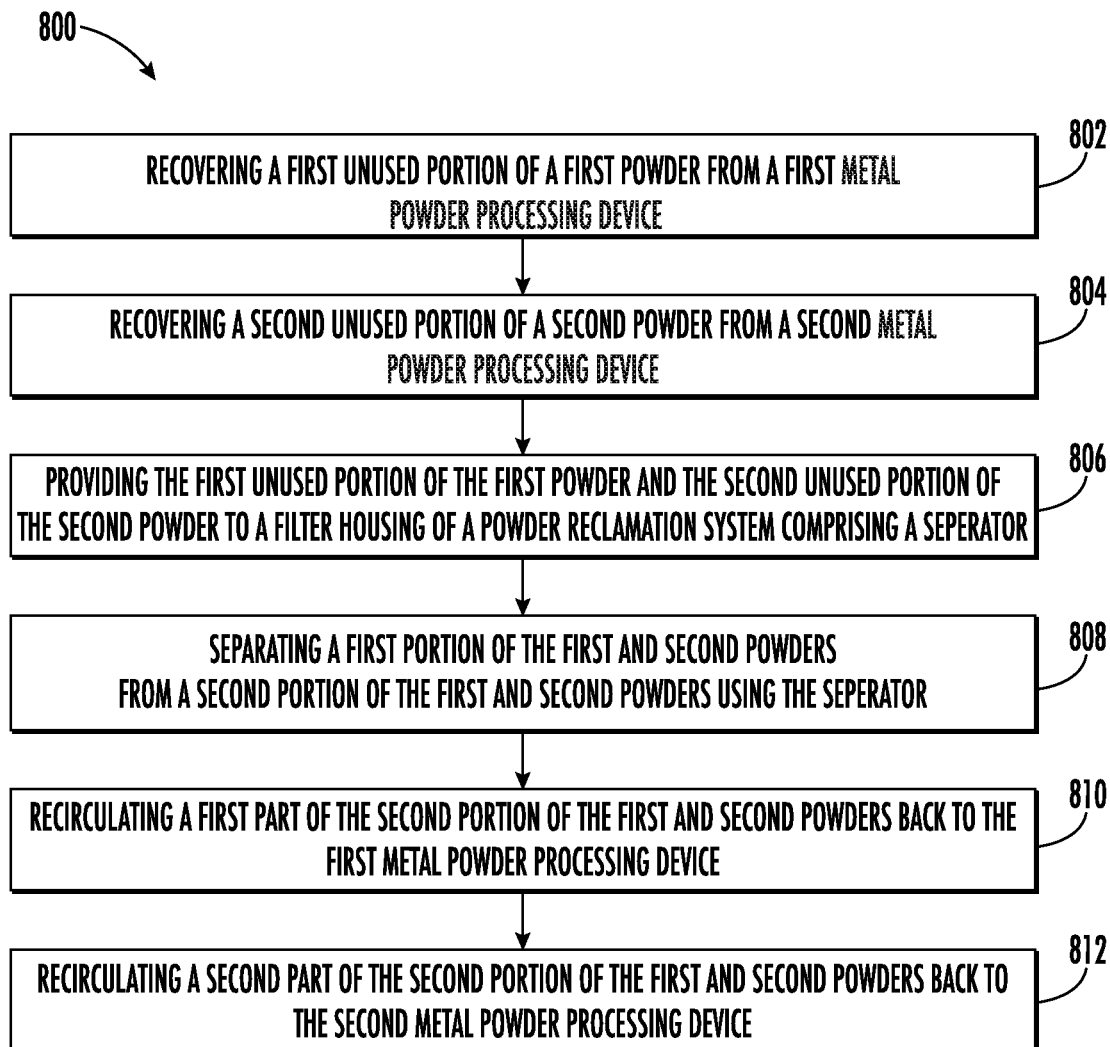
FIG. 23 is a flow diagram of a method of reclaiming powder using a powder reclamation system in accordance with another exemplary aspect of the present disclosure.

Referring now to FIG. 23, a method 800 of reclaiming powder in accordance with an exemplary aspect of the present disclosure is depicted. The exemplary method 800 may be utilized to operate one or more of the exemplary powder reclamation systems and/or sieving systems described above with reference to FIGS. 1 through 19.

For the exemplary aspect of FIG. 23, the method 800 generally includes at (802) recovering a first unused portion of a first powder from a first metal powder processing device. The method 800 further includes at (804) recovering a second unused portion of a second powder from a second metal powder processing device.

The method 800 includes at (806) providing the first unused portion of the first powder and the second unused portion of the second powder to a housing of a powder reclamation system comprising a separator as described in detail above with reference to one or more of the exemplary powder reclamation systems and/or sieving systems described above with reference to FIGS. 1 through 19.

For the exemplary aspect depicted, the method 800 further includes at (808) separating a first portion of the first and second powders from a second portion of the first and second powders using the separator.

The method 800 includes at (810) recirculating a first part of the second portion of the first and second powders back to the first metal powder processing device. The method 800 further includes at (812) recirculating a second part of the second portion of the first and second powders back to the second metal powder processing device.

Figure 24:
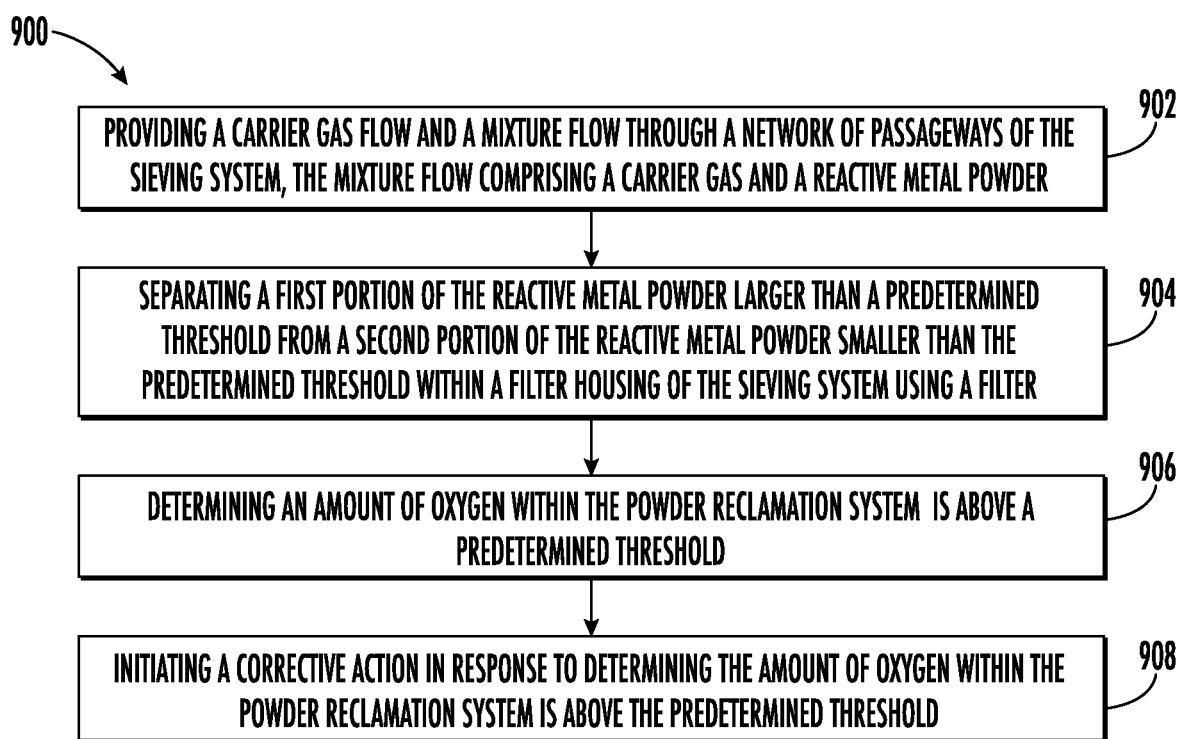
FIG. 24 is a flow diagram of a method of operating a sieving system in accordance with an exemplary aspect of the present disclosure.

Referring now to FIG. 24, a method 900 of operating a sieving system in accordance with an exemplary aspect of the present disclosure is depicted. The exemplary method 900 may be utilized to operate one or more of the exemplary sieving systems described above with reference to FIGS. 1 through 19.

For the exemplary aspect of FIG. 24, the method 900 generally includes at (902) providing a carrier gas flow and a mixture flow through a network of passageways of the sieving system, the mixture flow comprising a carrier gas and a reactive metal powder.

In an exemplary embodiment, a system of the present disclosure provides a carrier gas flow and a mixture flow through a network of passageways of the system that has a ratio of gas (e.g., in kg) to powder (e.g., in kg) below approximately 1:6.

In other exemplary embodiments, a system of the present disclosure provides a carrier gas flow and a mixture flow through a network of passageways of the system that has a ratio of gas (e.g., in kg) to powder (e.g., in kg) below approximately 1:10.

In other exemplary embodiments, a system of the present disclosure provides a carrier gas flow and a mixture flow through a network of passageways of the system that has a ratio of gas (e.g., in kg) to powder (e.g., in kg) below approximately 1:5.

In other exemplary embodiments, a system of the present disclosure provides a carrier gas flow and a mixture flow through a network of passageways of the system that has other ratios of gas (e.g., in kg) to powder (e.g., in kg).

In some exemplary embodiments, a system of the present disclosure includes a first region that provides a carrier gas flow and a mixture flow through a network of passageways of the system that has a first ratio of gas (e.g., in kg) to powder (e.g., in kg) and includes a second region that provides a carrier gas flow and a mixture flow through a network of passageways of the system that has a second ratio of gas (e.g., in kg) to powder (e.g., in kg) that is different than the first ratio.

The method 900 further includes at (904) separating a first portion of the reactive metal powder larger than a predetermined threshold from a second portion of the reactive metal powder smaller than the predetermined threshold within a filter housing of the sieving system using a filter.

The method 900 further includes at (906) determining an amount of oxygen within the powder reclamation system is above a predetermined threshold.

The method 900 further includes at (908) initiating a corrective action in response to determining the amount of oxygen within the powder reclamation system is above the predetermined threshold.

Further aspects of the invention are provided by the subject matter of the following clauses:

1. A powder reclamation system, comprising: a support structure; a filter housing movable relative to the support structure, the filter housing defining an inlet and an outlet; a raw reclaimed powder hopper in communication with the inlet of the filter housing; a first reclamation passageway in communication with the raw reclaimed powder hopper and configured to be in communication with a first metal powder processing device to recover a first unused portion of a first powder from the first metal powder processing device to the raw reclaimed powder hopper; and a second reclamation passageway in communication with the raw reclaimed powder hopper and configured to be in communication with a second metal powder processing device to recover a second unused portion of a second powder from the second metal powder processing device to the raw reclaimed powder hopper.

2. The powder reclamation system of any preceding clause, further comprising: a broad frequency filter disposed between the inlet and the outlet of the filter housing, the broad frequency filter configured to restrict a first portion of the first and second powders larger than a predetermined threshold from reaching the outlet and to allow a second portion of the first and second powders smaller than the predetermined threshold to pass therethrough.

3. The powder reclamation system of any preceding clause, further comprising: a filtered reclaimed powder hopper in communication with the outlet of the filter housing, wherein the filtered reclaimed powder hopper receives the second portion of the first and second powders that passes through the broad frequency filter.

4. The powder reclamation system of any preceding clause, further comprising: a first recirculation passageway in communication with the filtered reclaimed powder hopper and configured to be in communication with the first metal powder processing device to recirculate a first part of the second portion of the first and second powders back to the first metal powder processing device.

5. The powder reclamation system of any preceding clause, further comprising: a second recirculation passageway in communication with the filtered reclaimed powder hopper and configured to be in communication with the second metal powder processing device to recirculate a second part of the second portion of the first and second powders back to the second metal powder processing device.

6. The powder reclamation system of any preceding clause, further comprising: a virgin powder hopper comprising a virgin powder; and a controller operable to selectively dose the second portion of the first and second powders with the virgin powder at a location upstream of the first and second metal powder processing devices.

7. The powder reclamation system of any preceding clause, wherein the broad frequency filter comprises: a first filter fixed relative to the filter housing, the first filter being substantially rigid; and a second filter coupled within the filter housing adjacent to the first filter, the second filter being substantially flexible such that the second filter is movable relative to the first filter within the filter housing when the filter housing moves relative to the support structure.

8. The powder reclamation system of any preceding clause, further comprising: a controller operable to control an amount of the first unused portion of the first powder that is recovered from the first metal powder processing device to the raw reclaimed powder hopper and control an amount of the second unused portion of the second powder that is recovered from the second metal powder processing device to the raw reclaimed powder hopper.

9. The powder reclamation system of any preceding clause, wherein the first reclamation passageway defines a first cross-sectional area, wherein the second reclamation passageway defines a second cross-sectional area, and wherein the first cross-sectional area is different than the second cross-sectional area.

10. The powder reclamation system of any preceding clause, wherein the first reclamation passageway defines a first length, wherein the second reclamation passageway defines a second length greater than the first length, and wherein the first cross-sectional area is less than the second cross-sectional area.

11. A method of reclaiming powder using a powder reclamation system, the method comprising: recovering a first unused portion of a first powder from a first metal powder processing device; recovering a second unused portion of a second powder from a second metal powder processing device; providing the first unused portion of the first powder and the second unused portion of the second powder to a housing of a powder reclamation system comprising a separator; separating a first portion of the first and second powders from a second portion of the first and second powders using the separator; recirculating a first part of the second portion of the first and second powders back to the first metal powder processing device; and recirculating a second part of the second portion of the first and second powders back to the second metal powder processing device.

12. The method of any preceding clause, wherein recovering the first unused portion of the first powder from the first metal powder processing device comprises controlling an amount of the first unused portion of the first powder that is recovered from the first metal powder processing device.

13. The method of any preceding clause, wherein recovering the second unused portion of the second powder from the second metal powder processing device comprises controlling an amount of the second unused portion of the second powder that is recovered from the second metal powder processing device.

14. The method of any preceding clause, wherein controlling the amount of the first unused portion of the first powder that is recovered from the first metal powder processing device comprises controlling a parameter of a carrier gas flow through a first reclamation passageway.

15. The method of any preceding clause, wherein recirculating the first part of the second portion of the first and second powders back to the first metal powder processing device comprises controlling an amount of the first part of the second portion of the first and second powders that is recirculated back to the first metal powder processing device.

16. The method of any preceding clause, wherein recirculating the second part of the second portion of the first and second powders back to the second metal powder processing device comprises controlling an amount of the second part of the second portion of the first and second powders that is recirculated back to the second metal powder processing device.

17. The method of any preceding clause, wherein controlling the amount of the first part of the second portion of the first and second powders that is recirculated back to the first metal powder processing device comprises controlling a parameter of a carrier gas flow through a first recirculation passageway.

18. The method of any preceding clause, further comprising: determining an operating parameter of the powder reclamation system; and controlling the recovering the first and second unused portions of the first and second powders in response to the operating parameter of the powder reclamation system.

19. The method of any preceding clause, further comprising: determining an operating parameter of the powder reclamation system; and controlling the recirculating the first and second parts of the second portion of the first and second powders in response to the operating parameter of the powder reclamation system.

20. The method of any preceding clause, further comprising: determining an operating parameter of the first metal powder processing device, of the second metal powder processing device, or both; and controlling the recirculating the first and second parts of the second portion of the first and second powders in response to the determined operating parameter.

21. The method of any preceding clause, further comprising: determining a need for additional powder for the first metal powder processing device, for the second metal powder processing device, or both; and controlling the recirculating the first and second parts of the second portion of the first and second powders in response to the determined need for additional powder.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A powder reclamation system, comprising:
a support structure;
a filter housing movable relative to the support structure, the filter housing defining an inlet and an outlet and including a continuous U-shaped seal;
a raw reclaimed powder hopper in communication with the inlet of the filter housing;
a first reclamation passageway in communication with the raw reclaimed powder hopper and configured to be in communication with a first metal powder processing device to recover a first unused portion of a first powder from the first metal powder processing device to the raw reclaimed powder hopper;
a second reclamation passageway in communication with the raw reclaimed powder hopper and configured to be in communication with a second metal powder processing device to recover a second unused portion of a second powder from the second metal powder processing device to the raw reclaimed powder hopper;
a multiple metal powder processing device attachment assembly including a multi-source input attachment system having a first connection portion that communicates the first reclamation passageway to the raw reclaimed powder hopper and a second connection portion that communicates the second reclamation passageway to the raw reclaimed powder hopper, and
a filter disposed between the inlet and the outlet of the filter housing, the filter configured to restrict a first portion of the first and second unused portions of the first and second metal powders larger than a predetermined threshold from reaching the outlet and to allow a second portion of the first and second unused portions of the first and second metal powders smaller than the predetermined threshold to pass therethrough;
wherein the first connection portion is located at a first side of the raw reclaimed powder hopper, and wherein the second connection portion is located at a second side of the raw reclaimed powder hopper opposite the first side,
wherein the continuous U-shaped seal extends around the filter;
wherein the filter comprises:
a first filter fixed relative to the filter housing, the first filter being substantially rigid; and
a second filter coupled within the filter housing adjacent to the first filter, the second filter being substantially flexible such that the second filter is movable relative to the first filter within the filter housing when the filter housing moves relative to the support structure,
wherein the filter housing defines an upstream portion located upstream of the first filter and the second filter and a downstream portion located downstream of the first filter and the second filter, the continuous U-shaped seal extending continuously from the upstream portion, around an outside edge of the first filter and an outside edge of the second filter, to the downstream portion.

2. The powder reclamation system of claim 1, further comprising:
a filtered reclaimed powder hopper in communication with the outlet of the filter housing, wherein the filtered reclaimed powder hopper receives the second portion of the first and second unused portion of the first and second powders that passes through the filter.

3. The powder reclamation system of claim 2, further comprising:
a first recirculation passageway in communication with the filtered reclaimed powder hopper and configured to be in communication with the first metal powder processing device to recirculate a first part of the second portion of the first and second unused portions of the first and second powders back to the first metal powder processing device.

4. The powder reclamation system of claim 3, further comprising:
a second recirculation passageway in communication with the filtered reclaimed powder hopper and configured to be in communication with the second metal powder processing device to recirculate a second part of the second portion of the first and second unused portions of the first and second metal powders back to the second metal powder processing device.

5. The powder reclamation system of claim 4, further comprising:
a virgin powder hopper comprising a virgin powder; and
a controller operable to selectively dose the second portion of the first and second unused portions of the first and second metal powders with the virgin powder at a location upstream of the first and second metal powder processing devices.

6. The powder reclamation system of claim 1, further comprising:
 a controller operable to control an amount of the first unused portion of the first powder that is recovered from the first metal powder processing device to the raw reclaimed powder hopper and control an amount of the second unused portion of the second powder that is recovered from the second metal powder processing device to the raw reclaimed powder hopper.

7. The powder reclamation system of claim 1, wherein the first reclamation passageway defines a first cross-sectional area, wherein the second reclamation passageway defines a second cross-sectional area, and wherein the first cross-sectional area is different than the second cross-sectional area.

8. The powder reclamation system of claim 7, wherein the first reclamation passageway defines a first length, wherein the second reclamation passageway defines a second length greater than the first length, and wherein the first cross-sectional area is less than the second cross-sectional area.

9. The powder reclamation system of claim 1, wherein the second metal powder processing device comprises:
 a second support structure;
 a second filter housing movable relative to the second support structure, the second filter housing defining a second inlet and a second outlet; and
 a second filter disposed between the second inlet and the second outlet of the second filter housing.

\* \* \* \* \*